(12) United States Patent
Debbage et al.

(10) Patent No.: US 12,137,001 B2
(45) Date of Patent: Nov. 5, 2024

(54) SCALABLE PROTOCOL-AGNOSTIC RELIABLE TRANSPORT

(71) Applicant: Intel Corporation, Santa Clara, CA (US)

(72) Inventors: Mark Debbage, Santa Clara, CA (US); Bruce G. Warren, Poulsbo, WA (US)

(73) Assignee: Intel Corporation, Santa Clara, CA (US)

(*) Notice: Subject to any disclaimer, the term of this patent is extended or adjusted under 35 U.S.C. 154(b) by 211 days.

(21) Appl. No.: 17/483,668

(22) Filed: Sep. 23, 2021

(65) Prior Publication Data

US 2022/0085916 A1 Mar. 17, 2022

Related U.S. Application Data

(60) Provisional application No. 63/149,129, filed on Feb. 12, 2021, provisional application No. 63/130,668, filed on Dec. 26, 2020.

(51) Int. Cl.
*H04L 1/1607* (2023.01)
*H04L 49/90* (2022.01)
*H04L 69/22* (2022.01)

(52) U.S. Cl.
CPC ........ *H04L 1/1621* (2013.01); *H04L 49/9068* (2013.01); *H04L 69/22* (2013.01)

(58) Field of Classification Search
CPC ... H04L 1/1621; H04L 49/9068; H04L 69/22; H04L 1/1614; H04L 1/1635; H04L 1/165; H04L 1/1664; H04L 1/1806; H04L 1/1809; H04L 1/1832; H04L 1/1848; H04L 47/10; H04L 47/34; H04L 1/1896; H04L 69/18
See application file for complete search history.

(56) References Cited

U.S. PATENT DOCUMENTS

| | | | |
|---|---|---|---|
| 2005/0190700 A1* | 9/2005 | Melpignano | H04W 74/06 370/244 |
| 2014/0181140 A1* | 6/2014 | Kim | H04L 67/06 707/769 |
| 2018/0004705 A1* | 1/2018 | Menachem | H04L 67/1097 |
| 2019/0306871 A1* | 10/2019 | Liu | H04W 28/06 |

(Continued)

FOREIGN PATENT DOCUMENTS

EP 1720279 A1 11/2006

OTHER PUBLICATIONS

"TCP Selective Acknowledgments (SACK)", PacketLife.net, https://packetlife.net/blog/2010/jun/17/tcp-selective-acknowledgments-sack/, Jun. 17, 2010, 5 pages.

(Continued)

*Primary Examiner* — Thien Nguyen
(74) *Attorney, Agent, or Firm* — Compass IP Law PC

(57) ABSTRACT

Examples described herein relate to a network interface device that includes circuitry to track one or more gaps in received packet sequence numbers using data and circuitry to indicate to a sender of packets non-delivered packets to identify a range of delivered packets. In some examples, the data identifies delivered packets and undelivered packets for one or more connections. In some examples, to indicate to a sender of packets non-delivered packets to identify a range of delivered packets, the circuitry is to provide negative acknowledgement sequence range indicating a start and end of non-delivered packets.

18 Claims, 19 Drawing Sheets

(56) References Cited

U.S. PATENT DOCUMENTS

2019/0357202 A1* 11/2019 Tang .................. H04L 47/34
2020/0092043 A1* 3/2020 Xue .................. G05D 1/0022

OTHER PUBLICATIONS

Extended European Search Report for Patent Application No. 21213518.0, Mailed May 2, 2022, 10 pages.
European First Office Action, (EP Exam Report Article 94(3) EPC), for Patent Application No. 21213518.0, Mailed Jun. 2, 2023, 6 pages.
RFC: 793, "Transmission Control Protocol", DARPA Internet Program Protocol Specification, Information Sciences Institute, University of Southern California, Sep. 1981, 93 pages.

* cited by examiner

| Bytes | 3 | | | | | | | | 2 | | | | | | | | 1 | | | | | | | | 0 | | | | | | | |
|---|---|---|---|---|---|---|---|---|---|---|---|---|---|---|---|---|---|---|---|---|---|---|---|---|---|---|---|---|---|---|---|---|
| Bits | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| DWA | DSN[23:0] ||||||||||||||||||||||||  OPCODE |||| C E D | F M | RSV ||
| DWD | ACK_DSN[23:0] |||||||||||||||||||||||| ACK_INFO |||| ACK_CODE ||||

FIG. 6D

| Bytes | 3 | | | | | | | | 2 | | | | | | | | 1 | | | | | | | | 0 | | | | | | | |
|---|---|---|---|---|---|---|---|---|---|---|---|---|---|---|---|---|---|---|---|---|---|---|---|---|---|---|---|---|---|---|---|---|
| Bits | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| DWA | DSN[23:0] |||||||||||||||||||||||| OPCODE |||| C E D | F M | RSV ||
| DWB | DST_EECN |||||||||||||||||||||||| DSN[31:24] ||||||||
| DWC | SRC_EECN |||||||||||||||||||||||| ACK_DSN[31:24] ||||||||
| DWD | ACK_DSN[23:0] |||||||||||||||||||||||| ACK_INFO |||| ACK_CODE ||||

| | Offset of DSN relative to N | | | | | | | | | | | | | | | | | | | | |
|---|---|---|---|---|---|---|---|---|---|---|---|---|---|---|---|---|---|---|---|---|---|
| Past | 0 | 1 | 2 | 3 | 4 | 5 | 6 | 7 | 8 | 9 | 10 | 11 | 12 | 13 | 14 | 15 | 16 | 17 | 18 | 19 | Future |
| 1 | | | | | | | | | | | | | | | | | | | | | |

FIG. 10A

| | Offset of DSN relative to N | | | | | | | | | | | | | | | | | | | | |
|---|---|---|---|---|---|---|---|---|---|---|---|---|---|---|---|---|---|---|---|---|---|
| Past | 0 | 1 | 2 | 3 | 4 | 5 | 6 | 7 | 8 | 9 | 10 | 11 | 12 | 13 | 14 | 15 | 16 | 17 | 18 | 19 | Future |
| 1 | | | | | D | | | | | | | | | | | | | | | | |

ACK_SEQ_NAK_RANGE(N+0,N+4)

FIG. 10B

| | Offset of DSN relative to N | | | | | | | | | | | | | | | | | | | | |
|---|---|---|---|---|---|---|---|---|---|---|---|---|---|---|---|---|---|---|---|---|---|
| Past | 0 | 1 | 2 | 3 | 4 | 5 | 6 | 7 | 8 | 9 | 10 | 11 | 12 | 13 | 14 | 15 | 16 | 17 | 18 | 19 | Future |
| 1 | | | | | 1 | D | | | | | | | | | | | | | | | |

ACK_ONE(N+5)

FIG. 10C

| | Offset of DSN relative to N | | | | | | | | | | | | | | | | | | | | |
|---|---|---|---|---|---|---|---|---|---|---|---|---|---|---|---|---|---|---|---|---|---|
| Past | 0 | 1 | 2 | 3 | 4 | 5 | 6 | 7 | 8 | 9 | 10 | 11 | 12 | 13 | 14 | 15 | 16 | 17 | 18 | 19 | Future |
| 1 | | | | | 1 | 1 | D | | | | | | | | | | | | | | |

ACK_RANGE(N+4,N+6)

FIG. 10D

| | Offset of DSN relative to N | | | | | | | | | | | | | | | | | | | | |
|---|---|---|---|---|---|---|---|---|---|---|---|---|---|---|---|---|---|---|---|---|---|
| Past | 0 | 1 | 2 | 3 | 4 | 5 | 6 | 7 | 8 | 9 | 10 | 11 | 12 | 13 | 14 | 15 | 16 | 17 | 18 | 19 | Future |
| 1 | | | | | 1 | 1 | 1 | | | | | D | | | | | | | | | |

SEQ_NAK_RANGE(N+7,N+11)

FIG. 10E

Offset of DSN relative to N

| Past | 0 | 1 | 2 | 3 | 4 | 5 | 6 | 7 | 8 | 9 | 10 | 11 | 12 | 13 | 14 | 15 | 16 | 17 | 18 | 19 | Future |
|---|---|---|---|---|---|---|---|---|---|---|---|---|---|---|---|---|---|---|---|---|---|
| 1 |   |   |   |   | 1 | 1 | 1 |   |   |   |    | 1  | 1  | 1  | D  |    |    |    |    |    |        |

ACK RANGE(N+11,N+14)

FIG. 10F

Offset of DSN relative to N

| Past | 0 | 1 | 2 | 3 | 4 | 5 | 6 | 7 | 8 | 9 | 10 | 11 | 12 | 13 | 14 | 15 | 16 | 17 | 18 | 19 | Future |
|---|---|---|---|---|---|---|---|---|---|---|---|---|---|---|---|---|---|---|---|---|---|
| 1 |   |   |   |   | 1 | 1 | 1 |   |   |   |    | 1  | 1  | 1  | 1  |    |    |    |    |    | D      |

SEQ NAK RANGE(N+15,N+19)

FIG. 10G

Offset of DSN relative to N

| Past | 0 | 1 | 2 | 3 | 4 | 5 | 6 | 7 | 8 | 9 | 10 | 11 | 12 | 13 | 14 | 15 | 16 | 17 | 18 | 19 | Future |
|---|---|---|---|---|---|---|---|---|---|---|---|---|---|---|---|---|---|---|---|---|---|
| 1 |   |   |   |   | 1 | 1 | 1 | 1 | 1 | 1 | 1  | D  | 1  | 1  | 1  |    |    |    |    |    |        |

ACK RANGE(N+4,N+14)

FIG. 10H

Offset of DSN relative to N

| Past | 0 | 1 | 2 | 3 | 4 | 5 | 6 | 7 | 8 | 9 | 10 | 11 | 12 | 13 | 14 | 15 | 16 | 17 | 18 | 19 | Future |
|---|---|---|---|---|---|---|---|---|---|---|---|---|---|---|---|---|---|---|---|---|---|
| 1 | 1 | 1 | 1 | D | 1 | 1 | 1 | 1 | 1 | 1 | 1  | D  | 1  | 1  | 1  |    |    |    |    |    |        |

ACK UPTO(N+14)

FIG. 10I

SCALABLE PROTOCOL-AGNOSTIC RELIABLE TRANSPORT

RELATED APPLICATIONS

The present application claims the benefit of priority of U.S. Provisional application Ser. No. 63/130,668, filed Dec. 26, 2020 and U.S. Provisional application Ser. No. 63/149,129, filed Feb. 12, 2021. The contents of those applications are incorporated herein in their entirety.

BACKGROUND

A reliable transport protocol attempts to provide reliability of transmission of packets in a network by tracking receipt of packet sequence numbers at a transmitter and receiver. Reliable transport can support features such as smaller retransmission windows, selective acknowledgement, multi-path transmission, ordering, congestion control, and adaptive rate adjustments. Transmission control protocol (TCP) and Quick User Datagram Protocol (UDP) Internet Connections (QUIC) are examples of reliable transport protocols.

BRIEF DESCRIPTION OF THE DRAWINGS

FIG. 5 depicts an example of encodings.
FIGS. 6A-6B depicts examples of header formats.
FIGS. 6C-6D depicts examples of header formats with Piggyback Ack or Full Ack.
FIGS. 6E-6F depicts examples of header formats for Control.
FIGS. 10A-10I depict example states a window for use to track received sequence numbers.

DETAILED DESCRIPTION

Figure 1:
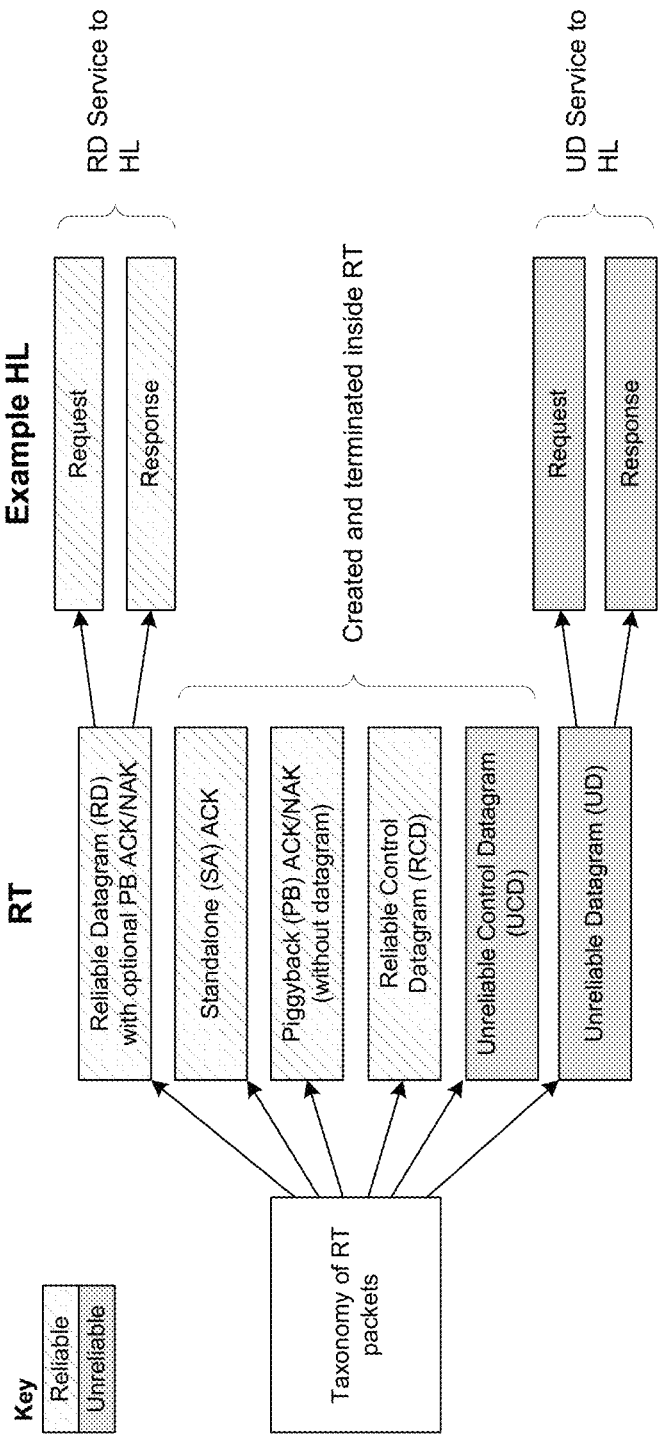
FIG. 1 depicts an example taxonomy of reliable transport (RT) packets.

Some examples can provide a reliable transport (RT) datagram communication model by a Scalable Protocol-Agnostic Reliable Transport (SPARTAN) where datagrams are agnostic of higher-layer transport protocol concerns such as higher-level connections, operation semantics, request/response protocols and congestion control. Some examples provide end-to-end Reliable Datagram (RD) communication between two endpoints (EPs) that can be used in Ethernet lossless and best-effort networks such as in configurations from as small as a single point-to-point link between two components up to data center scale, or beyond. RD communication can provide resiliency to packet loss by supporting go-back-N (GBN) retry and selective retry, support for lossless networks using Priority Flow Control (PFC), and/or support for best effort networks. Some examples provide concurrent support for go-back-N (GBN) retry and selective retry in a same network. In some examples, N can represent a number N packets or N octets (e.g., an octet can include 8 bits).

Unreliable datagrams (UD) provide a bypass of the reliability protocol while offering the same feature set with the exception of resilience to packet loss. Strict packet sequence number ordering may be supported or relaxed packet sequence number ordering may be supported to allow higher retry performance to be achieved for use cases that are tolerant of reordering without the use of a reorder buffer. In some cases, the datagram is delivered to the higher layer once at the target, or it is not delivered and an explicit error is returned to the initiator. Failover across ports and network paths can occur to ensure high availability in the presence of failing links.

Some examples of SPARTAN provide end-to-end data integrity using acyclic redundancy check (CRC) or invariant CRC. Other examples can utilize checksums, etc.

A RT Header (RTH) can be configured for efficient goodput, such as application level throughput, such as a number of useful information bits, delivered by the network to a certain destination, per unit of time. The amount of data considered can exclude protocol overhead bits as well as retransmitted data packets. In some examples, data frames can have as little as 4 bytes (B) of overhead or 8B if piggybacking an ACK. Optional fields can be used to convey information used in RTH In terms of the Open Systems Interconnection Model (OSI) model, a sublayer within the L4 Transport Layer can be used to support some examples of SPARTAN.

The following table provides an example description of acronyms used herein.

| Acronym | Example description |
| --- | --- |
| Ack | Acknowledgement, either positive or negative |
| ACK | Positive Acknowledgement |
| BER | Bit Error Rate |
| CC | Congestion Control |
| DRO | Datagram Receive Order |
| DSN | Datagram Sequence Number |
| DSO | Datagram Send Order |
| DW | Double Word (e.g., 4 bytes) |
| E2E | End-to-end |
| ECMP | Equal Cost Multi-Path Routing |
| ECN | Explicit Congestion Notification |
| EEC | End-to-end Context |
| EECN | End-to-end Context Number |
| EP | End point |
| FCS | Frame Checksum |
| GBN | Go-back-N: a retry protocol where the target provides the next expected sequence number (N) to the initiator, and the initiator rewinds back to N, and retries previously sent sequence numbers starting from N. |
| GO | Global Ordering |
| HL | Higher Level |
| ICRC | Invariant Cyclic Redundancy Code |
| LL | Lower level |
| MP | Multi-path |
| MPI | Message Passing Interface |
| NAK | Negative Acknowledgement |
| NP | Network Plane |
| PFC | Priority Flow Control |
| RoCE | RDMA over Converged Ethernet version 2 or later version |
| RCD | Reliable Control Datagram |
| RD | Reliable Datagram |

-continued

| Acronym | Example description |
|---|---|
| RT | Reliable Transport |
| RTH | Reliable Transport Header |
| RTT | Round-trip Time |
| SA | Standalone |
| SDN | Software be Defined Networking |
| SPARTAN | Scalable Protocol-Agnostic Reliable TrANsport |
| TC | Traffic Class |
| TP | Transaction Protocol |
| UCD | Unreliable Control Datagram |
| UD | Unreliable Datagram |

Some examples of SPARTAN support reliable datagrams and unreliable datagrams. RD can be the primary motivation for RT. UD can be provided as a bypass mechanism where E2E reliability is not required and may be useful for a variety of higher-level in-band protocols including management, telemetry and HL connection services. RD and/or UD can be capabilities that can be negotiated between the two sides of an RT connection as described herein.

In some examples, RD can be supported in some examples where: the RD, RCD and ACK opcodes are valid; reliability mechanisms (sequence number checks, acks, timeouts, retries) are enabled for RD and RCD opcodes; and ordering is described below with respect to Ordering Mode.

In some examples, when RD is not supported, the RD, RCD and ACK opcodes can be invalid and packets with these opcodes are not generated. If packets with these opcodes can be received, the receiver shall discard them and report an error locally.

In some examples, UD can be supported where: the UD and UCD opcodes are valid; RT does not provide ordering nor reliability for unreliable datagrams; reliability mechanisms (sequence number checks, acks, timeouts, retries) can be disabled for UD and UCD opcodes; and sequence number fields in UD packets can be reserved and shall be set to 0. UD can be a bypass of the RT reliability protocol. RT still provides E2E connections using EECs and EECNs. When UD is not supported, the UD and UCD opcodes can be invalid. Packets with these opcodes shall not be generated. If packets with these opcodes can be received, the receiver shall discard them and report an error locally.

In some examples, RD and UD can be supported concurrently on the same RT connection, and can be arbitrarily interleaved. RT provides no ordering between streams of reliable and unreliable datagrams and may arbitrarily reorder RD relative to UD regardless of RD ordering mode. RD and UD can be differentiated at the target by their opcode value. HL can impose its own protocol and conventions on the use of RD and UD to the extent required by HL.

FIG. 1 depicts an example taxonomy of RT Packets. Datagrams can be sent by an RT initiator (not shown) and received by the RT target (not shown). An "acknowledge" (or abbreviation "ack" in lower case) refers to acknowledgement information used to indicate the success or failure of a datagram. An "ACK" (upper case) can refer to a positive ack, and the term "NAK" (upper case) can refer to a negative ack. Acks can be sent by the target and received by the initiator. Acks can be sent as a standalone (SA) ack or piggybacked (PB) onto unrelated contemporaneous datagrams that can be travelling in the opposite direction of the same connection (e.g., see ACK Coalescing described herein). RT can support full acks and control datagrams. Acks and control datagrams can be created and terminated in the RT sublayer.

Traffic Classes and Flows

RT provides a bidirectional connection between two network endpoints attached to a common network plane. The RT connection supports end-to-end (E2E) reliable datagram communication. Many connections can be established involving many EPs, including multiple concurrent connections between two EPs, subject to the connection capacity limit of the implementation.

A "connection" can refer to RT connections whereas a "flow" can refer to RT flows, unless prefixed such as "HL connection" or "HL flow". For a connection using a single traffic class, RT uses the following flow definitions specified using a tuple notation:

(NP, $EP_A$, $EECN_A$, $EP_B$, $EECN_B$, TC)—request and response flow from $NP:EP_A:EECN_A$ to $NP:EP_B:EECN_B$ (NP, $EP_B$, $EECN_B$, $EP_A$, $EECN_A$, TC)—request and response flow from $NP:EP_B:EECN_B$ to $NP:EP_A:EECN_A$ A connection can be associated with a pair of end-to-end contexts (EEC), one on at least one of the two network endpoints (EPs) forming the connection. The EECs provide the state for the reliability protocol. The EECs on an EP can be distinguished using 24-bit values called the EEC Number (EECN) supporting up to 16,777,216 EECs per EP.

A connection between two EPs, called A and B, can be described as:

$$(NP:EP_A:EECN_A:TC) \Leftrightarrow (NP:EP_B:EECN_B:TC),$$
where:

NP can be the network plane that both EPs can be attached to;

$EP_A$ can be the network address of A, and $EP_B$ can be the network address of B (addresses defined by LL);

$EECN_A$ can be the EEC number allocated on A, and $EECN_B$ can be the EEC number allocated on B; and TC represents the traffic class (or traffic classes).

A number of connections between two EPs can be just 1 and can be sufficient for connectivity. Multiple connections may provide one or more of: HL-driven multipathing (e.g., 4-8) to spread the workload over multiple paths; HL use of traffic classes for other purposes such as QoS; multiple HL connections between the two end points as in some use cases, multiple HL connections may share be RT connections and relatively few EECs but other use cases may utilize 1:1 mapping and large HL connection scale consuming a large number of EECs.

An RT connection can use 1 or 2 traffic classes, or other number of traffic classes as specified by an HL. For example, HL may provide separate traffic classes for requests and responses to reduce protocol-dependent deadlock. Alternatively, HL may utilize a single traffic class, e.g., HL does not use request/response flows or has some other deadlock solution. When 2 traffic classes are used, the RT implementation can provide independent flow of requests and responses between HL and LL in both directions.

Figure 2:
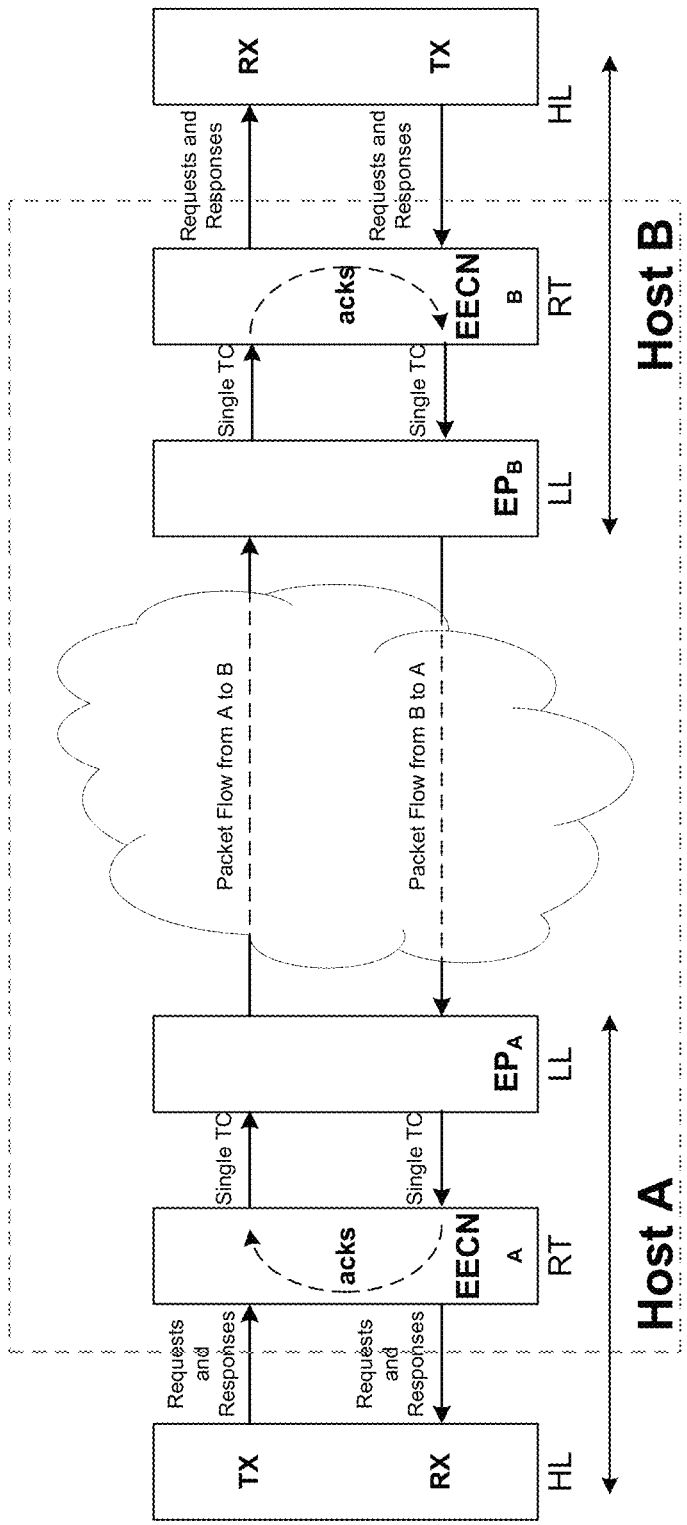
FIG. 2 depicts an example RT Connection using a single traffic class for requests and responses.

FIG. 2 depicts an example RT Connection using a single traffic class for requests and responses. An initiator can act as a requester for sent reliable requests or as a responder for sent reliable responses. The terms "transmit", "transmitter", "send" and "sender" can be used for packet egress from the host into the network, while the terms "receive" and "receiver" can be used for ingress of packets from the network to the host.

An initiator can include a network interface device, circuitry, and/or processors configured by instructions to perform one or more of: accepting new datagrams from the HL initiator; sending new datagrams via the LL to the network; tracking of datagrams to provide the deliver once or fail semantic; receiving ACKs and/or NAKs from the network via the LL, performing error checking on the received headers and updating the tracking state accordingly; implementing an initiator timeout mechanism to cause selective retry due to lost datagrams, ACKs and/or NAKs; implementing a retry mechanism to resend datagrams due to NAKs or initiator timeout using selective retry for relaxed ordering or reverting to GBN retry for strict ordering; delivering datagram completions to the HL initiator where a completion indicates whether the datagram has been delivered successfully to the HL target or indicates an error in delivery (such as target unreachable); or initialization, negotiation, control and error reporting features.

A target can include a network interface device, circuitry, and/or processors configured by instructions to perform one or more of: implementing a target receive window using a single entry for strict ordering and more than one entry for relaxed ordering, where a first entry in this window can be referred to as the next DSN; receiving datagrams from the network via the LL, performing error checking on the received RTH and updating the target receive window accordingly; delivering received datagrams to the HL according to the deliver once or fail semantic, for example, in datagram send order for strict ordering, and in datagram receive order for relaxed ordering; using a target receive window to detect duplicate datagrams and discard them; or initialization, negotiation, control and error reporting features.

A target can include network interface device, circuitry, and/or processors configured by instructions to send ACKs and/or NAKs via the LL to the network to inform the initiator of the state of the target receive window to deliver the precise state in a timely manner to ensure that the initiator can deliver completions or perform selective retry. However, since ACKs and NAKs may be dropped in the network, this is not always possible requiring initiator timeouts. The target may piggy-back or coalesce ACKs to better optimize bandwidth in the reverse direction, but the maximum time that an ACK may be kept waiting can be bounded by an ACK coalescing timer to ensure timely progress. When a NAK condition can be detected, the NAK can be scheduled to be sent. There can be no coalescing delay for NAKs, though some NAK formats provide more information than just one NAKed datagram.

Network interface device, circuitry, and/or processors configured by instructions can implement a LL and the LL can be responsible for one or more of: providing network addresses for identifying source and destination endpoints; delivery of packets from source to destination where for best-effort networks, delivery of packets can be expected to be mostly in-order and mostly reliable on a per connection basis or for lossless networks, delivery of packets can be expected to be in-order and reliable on a per connection basis; or providing 1 or 2 (or other number) traffic classes as required by HL and differentiating TC via LL headers.

Network interface device, circuitry, and/or processors configured by instructions can implement a RT and the RT can be responsible for one or more of: providing a reliable datagram delivery service on a per connection basis; providing strict ordering and relaxed ordering modes; providing independent flow of request and response datagrams through RT and this capability can be extended to LL and the network if requests and responses can be mapped to different traffic classes; or providing deliver once or fail semantics.

Network interface device, circuitry, and/or processors configured by instructions can implement a HL and HL can be responsible for one or more of: definition of messages, and network operation semantics (e.g., send/receive read/write, atomics, etc.); fragmentation of messages into datagrams, and reassembly of datagrams into messages; multipathing and load-balancing of datagrams across paths; congestion control; or quality of service.

Figure 3:
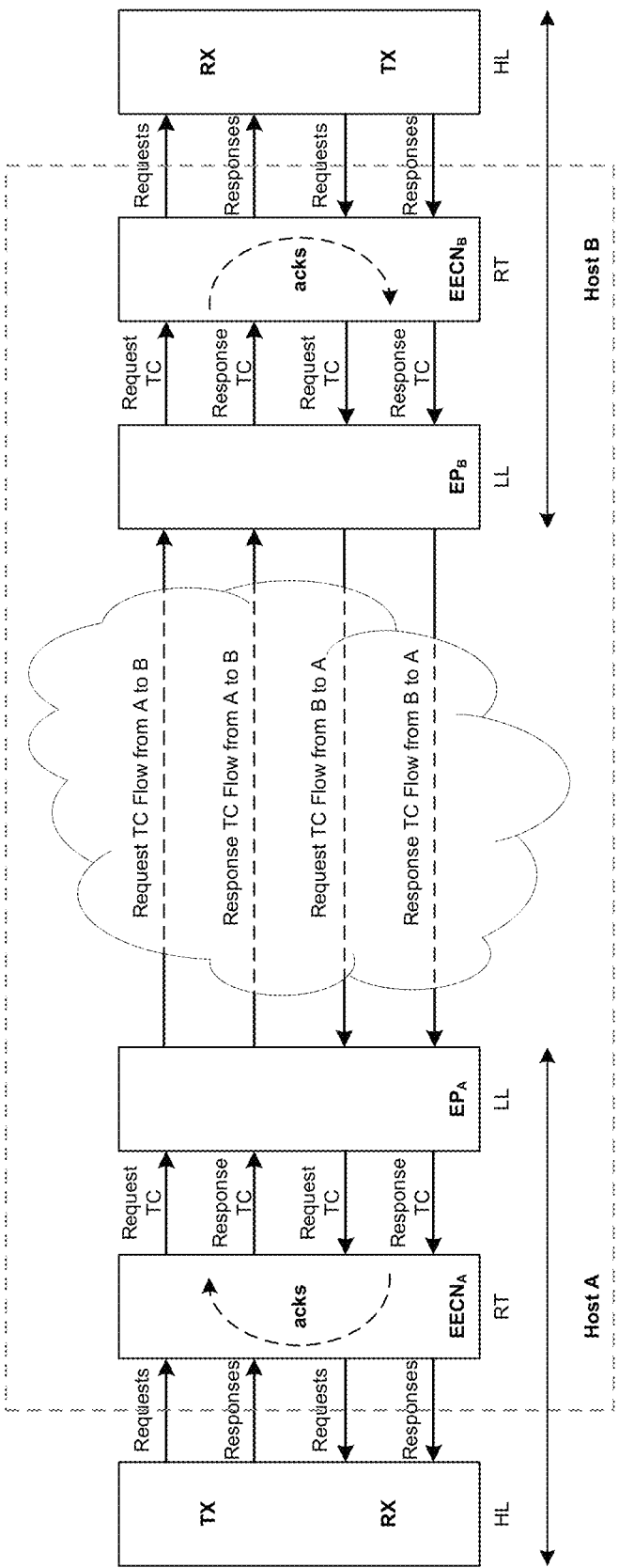
FIG. 3 depicts an example of a connection using two traffic classes.

FIG. 3 depicts an example of a connection using two traffic classes. For a connection using two traffic classes, RT can use the following flow definitions specified using a tuple notation:

(NP, $EP_A$, $EECN_A$, $EP_B$, $EECN_B$, $TC_{request}$)—request flow from $NP:EP_A:EECN_A$ to $NP:EP_B:EECN_B$ (NP, $EP_A$, $EECN_A$, $EP_B$, $EECN_B$, $TC_{response}$)—response flow from $NP:EP_A:EECN_A$ to $NP:EP_B:EECN_B$ (NP, $EP_B$, $EECN_B$, $EP_A$, $EECN_A$, $TC_{request}$)—request flow from $NP:EP_B:EECN_B$ to $NP:EP_A:EECN_A$ (NP, $EP_B$, $EECN_B$, $EP_A$, $EECN_A$, $TC_{response}$)—response flow from $NP:EP_B:EECN_B$ to $NP:EP_A:EECN_A$ RT protocol may not depend on ack ordering and the performance characteristics of the RT protocol can be tolerant of ack ordering. Piggybacked acks may be attached to request or response datagrams without limitation. Stand-alone acks can be sent on the response flow only.

The LL can preserve the datagram order on at least one flow (independent of other flows) so that datagrams sent by RT can be generally received in that same order with the exception of datagram drops. In an LL implementation, such a flow can use a single path through the network, for example, by hashing source and destination information from the flow tuple to select switch routes using ECMP. Multipathing in RT can be achieved at HL by mapping higher level transactions to multiple EECs. For example, a large single message can be distributed as packets across multiple EECs, to the same EP destination, using HL circuitry to implement appropriate fragmentation, reassembly and ordering.

Some flows have a temporal duration from creation to destruction of the connection. HL may apply workloads of elephant and mice HL flows. HL can decide how workloads are mapped to connections, and use packet distribution to achieve multipathing and traffic classes to give differentiated QoS. Hence, RT flows can be decoupled from workload HL flows.

Even though LL can preserve datagram order on a flow, LL may move flows from one network path to another network path. For example, ECMP hashes can be recomputed to provide load balancing, or when links/switches can be dynamically added or removed from the topology. This may cause transient deviations from in-order datagram delivery. RT can handle transient LL datagram reordering similarly to datagram drop and can transparently recover from them with transitory performance effects. These effects can be minimized when using relaxed ordering as described herein.

Ordering Modes

RT can support various modes for RD that can be selected on a per-connection basis such as (a) strict ordering mode in which reliable datagrams can be delivered by RT to HL in datagram send order (DSO) or (b) relaxed ordering mode in which reliable datagrams can be delivered by RT to HL in datagram receive order (DRO).

When using strict ordering, reliable datagrams can be guaranteed to be delivered by RT to HL using DSO where the order can be defined by the order in which the HL initiator provides new datagrams to the RT initiator (and this order may not be influenced by retries). Datagram loss or reordering can be detected at the target and invoke GBN retry to the next expected DSN. The target may deliver datagrams in DSO and this can lead to out-of-sequence datagrams being discarded at the target.

When using relaxed ordering, DRO can differ from DSO due to datagram loss or reordering in the network. Datagrams on a connection can still flow in a generally sequential manner using a single path through the network. Therefore, reordering at the RT sublayer can occur due to datagram loss or network path changes. RT can detect lost datagrams based on sequence number gaps or initiator-side timeouts and performs selective retry to only retransmit the specific datagrams that are identified as lost. RT may not use a reorder buffer, which can result in short periods of out-of-order delivery to HL consistent with the relaxed ordering semantic. HL may choose to propagate this property to the ULP or application assuming that out-of-order data delivery can be absorbed such as use cases including libfabrics and RDMA data delivery. Alternatively, HL can implement its own reordering capability (e.g., for MPI message order or RDMA completion ordering) or HL can be limited to using strict ordering only.

RT can use a unified reliability protocol that can be parameterized differently to support strict ordering and relaxed ordering modes. The following table provides modes that can be supported on both lossless and best-effort networks.

TABLE

Ordering Modes

| | Lossless Network | Best-effort Network |
| --- | --- | --- |
| Strict Ordering | This can be comparable to RoCE/RoCEv2 design point. | Performance impact of packet loss can be mitigated through system features to reduce packet loss. This can be comparable to the best-effort RoCEv2 design point. |
| Relaxed Ordering | Comparable performance to strict ordering since packet loss can be infrequent. | Significantly higher rates of packet loss can be tolerated using out-of-order delivery with significantly lower impact on performance |

The mode can be configured per connection using EEC state and is not encoded into RT packets. In some cases, RT may not provide ordering or reliability for unreliable datagrams.

Deliver Once

An HL initiator can issue datagrams to the RT initiator for reliable delivery to the HL target. RT can provide a deliver once or fail semantic, even in the presence of arbitrary datagram drops, datagram reordering or connectivity loss between the initiator and the target. For a datagram issued by the HL initiator, the RT initiator may return a completion to the HL initiator that indicates either success or failure.

A SUCCESS can occur if the datagram has been successfully delivered by the RT target to the HL target. The datagram can be delivered exactly once with datagram ordering as per the ordering mode described in the previous section. The concept of datagram execution is not defined by RT, and therefore whether SUCCESS implies that the datagram has been "executed" by the HL target is not defined by RT. HL may define its own semantics for execution as appropriate to HL.

A FAILURE can occur if the datagram has not been delivered to the HL target and can not be delivered to the HL target. Various different FAILURE codes may be distinguished such as indicating connectivity loss between initiator and target.

SUCCESS or FAILURE codes can be specific to a particular datagram and can be returned synchronously in the RT completion for that datagram. Other error cases, that is not specific to a particular datagram, can be reported via implementation-specific asynchronous error reporting (e.g., not associated with a particular datagram completion).

Between an HL initiator issuing a datagram and the completion being returned to the HL initiator, the datagram can be pending. RT can send the datagram and may retry the datagram multiple times between issue and completion. Retry may regenerate the originally sent datagram and a retry implementation may include visibility of the retry to the HL (e.g., due to re-reading of the datagram content from memory). After the completion has been returned, indicating either SUCCESS or FAILURE, no more RT retries of that datagram may be performed. A particular HL implementation may generate a subsequent new datagram for an HL retry capability, but that can be beyond the scope of RT and not required by RT.

An HL implementation may have alternate HL-specific mechanism for inferring datagram success. For example, an example request/response protocol may be constructed as follows: a datagram for a request from an HL requester to an HL responder; execution of the request at the HL responder; a datagram for a response from the HL responder to the HL requester; or receipt of the response datagram at the HL requester can infer that the request datagram has been successfully completed and executed at the HL responder.

However, the RT architecture can be protocol-agnostic and can be unaware of the HL request/response relationship. RT can provide a SUCCESS/FAILURE completion per datagram, including both request datagrams and response datagrams, and the RT retry behavior can be as described earlier. Consider a scenario where the ACK for the request can be dropped, and the response datagram can be delivered. The HL requester may infer from the responder datagram that the request has been delivered and executed at the responder. However, RT may still retry the request in order to recover from the dropped ACK for the request, and HL can support this mechanism allowing RT to regenerate the original datagram for the retry. The HL initiator can wait for both the request datagram completion and the responder datagram arrival before determining that the request/response transaction can be complete. Even then, the response ACK may also be dropped leading to response retry which the HL implementation can be able to resolve correctly.

Example Packet Format

Figure 4:
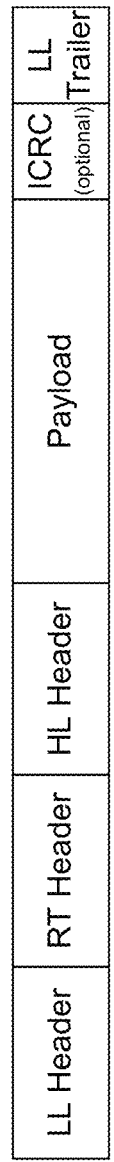
FIG. 4 depicts an example packet format.

FIG. 4 depicts an example packet format. LL header can represent lower layer headers such as packet framing (including length), destination EP address and TC. An LL header can include a field that indicates that it can be followed by the RT Header (RTH). An RT header can represent a reliable transport protocol header as described herein. An HL header can represent higher layer headers. Payload can be the packet payload. RT ICRC can be an optional 32-bit CRC that protects the packet content including RTH, HL header and payload. For example, a CRC algorithm and polynomial can be that specified by RoCEv2 and can cover DWs from the beginning of RTH through the end of the payload inclusive. These fields can be invariant from the initiator through the network to the target. LL trailer can be the lower layer trailer covering any additional trailing packet content defined by LL (this can be simply FCS for an Ethernet LL).

FORMAT can be a 1-bit field to allow for two format variants of the RTH, namely FORMAT 0 or FORMAT 1. FORMAT 0 can be used to indicate the EECN values is not encoded in RTH but can be instead encoded in LL headers. They can be extracted from LL fields directly or by hash look-up using implementation-defined algorithms. This can be appropriate for encapsulations where headers can be very densely encoded, and there can be already LL header fields that can be leveraged.

FORMAT 1 can indicate that the EECN values can be explicit in the RTH and no such assistance from LL may be performed.

A connection can be configured to run either FORMAT 0 or FORMAT 1, and the two formats may not be intermingled on a connection. Use of FORMAT 0 can involve two EPs agreeing on a method used to encode EECN values in LL.

An RTH format can be constructed by concatenating DW (e.g., Double Word=4 bytes) encodings, labelled DWA, DWB, DWC, DWD and DWE. The sequence and number of DWs can be decoded from the FORMAT and OPCODE fields. DWA can be a first DW in an RTH and include CONG ECHO, FORMAT, OPCODE, and DSN[23:0]. DWB and DWC can include DST_EECN, DSN[31:24], SRC_EECN and ACK_DSN[31:24] and can be present only when FORMAT=1. The SRC_EECN can be redundant information from the perspective of the receiver, but the receiver can validate this field against the expected value recorded in the destination EEC state. Switches can swap the DST_EECN and SRC_EECN fields in order to generate congestion control packets that can be returned directly to the sender. The extension of DSN from 24 bits to 32 bits provides additional stale packet protection as described herein concerning Sequence Numbers. DWD can be the DW encoding used by PB acks and full acks. DWE can be a DW encoding used by extension headers.

FIG. 5 depicts an example of RTH DW encodings. Reference can be made to the following tables for examples of content of DWA-DWE.

TABLE

| | | RTH DW Encodings | | | |
|---|---|---|---|---|---|
| DW | Field | Fields | Size | Example description | |
| DWA | RESERVED (RSVD in FIGS.) | [31:30] | 2 bits | Reserved for future features: Packet senders shall set reserved bits to 0. Packet receivers shall ignore the value of reserved bits. | |
| | CONG_ECHO (CE in FIGS.) | [29] | 1 bit | When a packet on the initiator-to-target path encounters congestion, the target may set this bit in a packet on the target-to-initiator path in order to echo the forwards congestion back to the initiator. | |
| | FORMAT (FM in FIGS.) | [28] | 1 bit | Selects the RTH format: 0: RTH does not contain DWB and DWC 1: RTH contains DWB and DWC | |
| | OPCODE | [27:24] | 4 bits | Specifies the RT opcode - see OPCODE Definitions table | |
| | DSN[23:0] | [23:0] | 24 bits | Datagram sequence number - lower 24 bits | |
| DWB | DSN[31:24] | [31:24] | 8 bits | Datagram sequence number - upper 8 bits | |
| | DST_EECN | [23:0] | 24 bits | Destination EECN | |
| DWC | ACK_DSN[31:24] | [31:24] | 8 bits | Acknowledged datagram sequence number - upper 8 bits | |
| | SRC_EECN | [23:0] | 24 bits | Source EECN | |
| DWD | ACK_CODE | [31:28] | 4 bits | Specifies the ACK/NAK opcode - see ACK_CODE Definitions table | |
| | ACK_INFO | [27:24] | 4 bits | Differentiates NAK reasons - see ACK_CODE Definitions table | |
| | ACK_DSN[23:0] | [23:0] | 24 bits | Acknowledged datagram sequence number - lower 24 bits | |
| DWE | EXTENSION | [31:0] | 32 bits | Opcode specific extension DW | |

RTH can include one or multiple DWs, and its length can be decoded from FORMAT and OPCODE[3] per the following table.

TABLE

| | | | FORMAT = 0 | | FORMAT = 1 | |
|---|---|---|---|---|---|---|
| OPCODE Value | OPCODE Name | Description | Header Format | Header Length | Header Format | Header Length |
| 0b0000 | RD | Reliable datagram | DWA | 1 DW | DWA DWB DWC | 3 DWs |
| 0b0001 | RD_RA | Reliable datagram, request ack | | | | |
| 0b0010 | SA_ACK_ONE | Standalone ACK- positively acknowledge one datagram | | | | |

TABLE-continued

OPCODE Definitions

| OPCODE Value | OPCODE Name | Description | FORMAT = 0 Header Format | FORMAT = 0 Header Length | FORMAT = 1 Header Format | FORMAT = 1 Header Length |
|---|---|---|---|---|---|---|
| 0b0011 | SA_ACK_UPTO | Standalone ACK- positively acknowledge datagrams up to (and including) number | | | | |
| 0b0100 | UD | Unreliable datagram | | | | |
| 0b0101 | — | Reserved | | | | |
| 0b0110 | — | Reserved | | | | |
| 0b0111 | — | Reserved | | | | |
| 0b1000 | RD_PB | Reliable datagram with PB ack | DWA DWD | 2 DWs | DWA DWB DWC DWD | 4 DWs |
| 0b1001 | RD_RA_PB | Reliable datagram, request ack, PB ack | | | DWC DWD | |
| 0b1010 | FULL_ACK | Full ack | | | | |
| 0b1011 | — | Reserved | | | | |
| 0b1100 | RCD | Reliable control datagram (can imply request ACK) | DWA DWE | 2 DWs | DWA DWB DWC DWE | 4 DWs |
| 0b1101 | UCD | Unreliable control datagram | | | | |
| 0b1110 | — | Reserved | | | | |
| 0b1111 | — | Reserved | | | | |

TABLE

ACK_CODE Definitions

| OPCODE FULL_ACK | ACK_CODE Value | ACK_CODE Name | Ack Type | Scope of Ack | ACK_INFO |
|---|---|---|---|---|---|
| Y | 0b0000 | NO_ACK | ACK | No scope-all other DWD fields can be reserved | Reserved |
| — | 0b0001 | Reserved | — | — | Reserved |
| — | 0b0010 | Reserved | — | — | Reserved |
| — | 0b0011 | Reserved | — | — | Reserved |
| Y | 0b0100 | ACK_ONE | ACK | ACK one datagram | Reserved |
| Y | 0b0101 | SEQ_NAK_ONE | Sequence NAK | NAK one datagram | Reserved |
| Y | 0b0110 | INV_NAK_ONE | Invalid datagram NAK | NAK one datagram | Reserved |
| Y | 0b0111 | RNR_NAK_ONE | Receiver not ready NAK | NAK one datagram | RNR timeout code |
| Y | 0b1000 | ACK_UPTO | ACK | ACK datagrams up to and including number | Reserved |
| Y | 0b1001 | SEQ_NAK_UPTO | Sequence NAK | ACK all earlier datagrams and NAK next datagram | Reserved |
| Y | 0b1010 | INV_NAK_UPTO | Invalid datagram NAK | ACK all earlier datagrams and NAK next datagram | Reserved |
| Y | 0b1011 | RNR_NAK_UPTO | Receiver not ready NAK | ACK all earlier datagrams and NAK next datagram | RNR timeout code |
| Y | 0b1100 | ACK_RANGE | ACK | ACK specified range | Reserved |
| Y | 0b1101 | SEQ_NAK_RANGE | Sequence NAK | NAK specified range and ACK next datagram | Reserved |

TABLE-continued

ACK_CODE Definitions

| OPCODE FULL_ACK | ACK_CODE Value | ACK_CODE Name | Ack Type | Scope of Ack | ACK_INFO |
|---|---|---|---|---|---|
| Y | 0b1110 | ACK_SEQ_NAK_RANGE | Sequence NAK | ACK all earlier datagrams, NAK specified range and ACK next datagram | Reserved |
| — | 0b1111 | Reserved | — | — | Reserved |

Requests and responses may be defined by HL. RT can use the same protocols for requests and responses, treating them as datagrams that are to be communicated reliably with no further interpretation of the HL headers, payload or purpose. A piggyback (PB) ack on a request can use the request TC, and other acks can use the response TC. Datagrams can use the request ACK (RA) variant to hint that the target should schedule an ACK more quickly in response to this datagram to reduce round-trip latency for the completion of this request. An ACK can be scheduled by the target regardless of whether RA can be requested or not. RA can be an indication to the target to terminate ACK coalescing, described herein. The initiator may not take special action to flush out acks for datagrams without RA as the target may schedule their ACK within some amount of time governed by the ACK coalescing timer.

Ack Encoding

Standalone ACKs can be encoded using the DWA encoding. NAKs can use DWD to carry a reason for a NAK. For encoding and packet efficiency, ACKs and NAKs can also be piggybacked onto datagrams using DWD. Additionally, there can be a FULL_ACK opcode which allows the full set of ACKs and NAKs to be encoded but without piggybacking onto a datagram. The options can be summarized in the following tables. The heading row of each table represents the sequence number space relative to the DSN and/or ACK_DSN values specified in the RTH. A cell in the table can be: ACK that sequence number can be positively acknowledged; NAK that sequence number can be negatively acknowledged; "-": a sequence number can be unaffected, neither positively nor negatively acknowledged.

TABLE

SA Ack Formats (using DSN)

|  | Earlier DSN | DSN | Later DSN |
|---|---|---|---|
| SA_ACK_ONE | — | ACK | — |
| SA_ACK_UPTO | ACK | ACK | — |

TABLE

PB Ack and Full Ack Formats (using ACK_DSN)

|  | Earlier DSN | ACK_DSN | Later DSN |
|---|---|---|---|
| ACK_ONE | — | ACK | — |
| ACK_UPTO | ACK | ACK | — |
| SEQ_NAK_ONE | — | SEQ_NAK | — |
| INV_NAK_ONE | — | INV_NAK | — |
| RNR_NAK_ONE | — | RNR_NAK | — |
| SEQ_NAK_UPTO | ACK | SEQ_NAK | — |
| INV_NAK_UPTO | ACK | INV_NAK | — |
| RNR_NAK_UPTO | ACK | RNR_NAK | — |

TABLE

Full Ack Formats (using both DSN and ACK_DSN)

|  | Earlier DSN | DSN | Between DSN and ACK_DSN | ACK_DSN | Later DSN |
|---|---|---|---|---|---|
| ACK_RANGE | — | ACK | ACK | ACK | — |
| SEQ_NAK_RANGE | — | SEQ NAK | SEQ NAK | ACK | — |
| ACK_SEQ_NAK_RANGE | ACK | SEQ NAK | SEQ NAK | ACK | — |

ACK_RANGE can specify that datagrams can be ACKed from DSN to ACK_DSN (both inclusive). ACK_RANGE can be used for coalescing of consecutive ACK ONEs following a sequence gap.

SEQ_NAK_RANGE can specify that datagrams can be NAKed from DSN (inclusive) to ACK_DSN (exclusive). The datagram at ACK_DSN can be ACKed. This can be used where some run of 1 or more datagrams can be dropped in the network and this can be discovered by the target by a subsequent datagram within the receive window which itself can be successfully received and delivered. ACK_SEQ_NAK_RANGE can be similar to SEQ_NAK_RANGE, but additionally acknowledges all earlier datagrams prior to the NAKed range.

Target Ack Behavior

A target can perform four different options for acknowledgement of a particular datagram, such as ACK, SEQ_NAK_*, INV_NAK_*, RNR_NAK_*.

ACK can represent a positive ack of the datagram. The target sends an ACK once the received datagram has been successfully delivered over the interface to the HL.

SEQ_NAK_* can represent a negative ack of the datagram due to a receipt of an unexpected datagram sequence number.

INV_NAK_* can represent an invalid datagram negative ack. This can occur when RT detects an invalid state or encoding and can be an error behavior that does not occur in normal use. INV_NAK can be to inform the initiator of the error. The error semantics can be used, but the expectation can be that this can be a fatal error to the RT connection.

RNR_NAK_* can represent receiver not ready (RNR) negative ack where the target receives a datagram but either the RT or the HL is not ready to process the datagram at this moment. The RNR_NAK carries a timeout code back to the initiator, and the initiator can retry the datagram (in an identical manner) at some point after that timeout has expired. This capability can be provided so that HL targets can make use of RT retry to solve transitory resource availability issues (as opposed to implementing another retry mechanism at HL).

Successful delivery of the datagram to HL may be required in order to acknowledge a datagram. There may be some local handshake in the successfully delivery determination that allows HL to influence the timing of the ACK allow an RT/HL implementation to further refine what can be meant "successfully delivered" according to HL specifications. For example, the datagram can be guaranteed to be successfully transferred to an HL buffer. In another example the operation has executed in some memory system and reached the point of "global ordering" (GO) and this implementation choice may allow HL responses to be eliminated for remote memory write operations, for example.

SEQ_NAK and INV_NAK can be implemented entirely within RT and have no visibility to HL.

RNR_NAK has visibility to the HL in that HL determines whether HL has resources for that datagram and to allow HL to specify the RNR timeout value which can be a prediction of when resources may become available. An implementation of the target may choose never to generate an RNR_NAK (for example, when there can be no RT nor HL scenarios that require the receiver not ready semantic).

RT may not provide any NAK error codes to report HL error cases to the initiator. HL can use its own response packets to deliver a stateful response back to the initiator, and this can be achieved reliably using RT reliable datagrams.

Figures 6A, 6B:
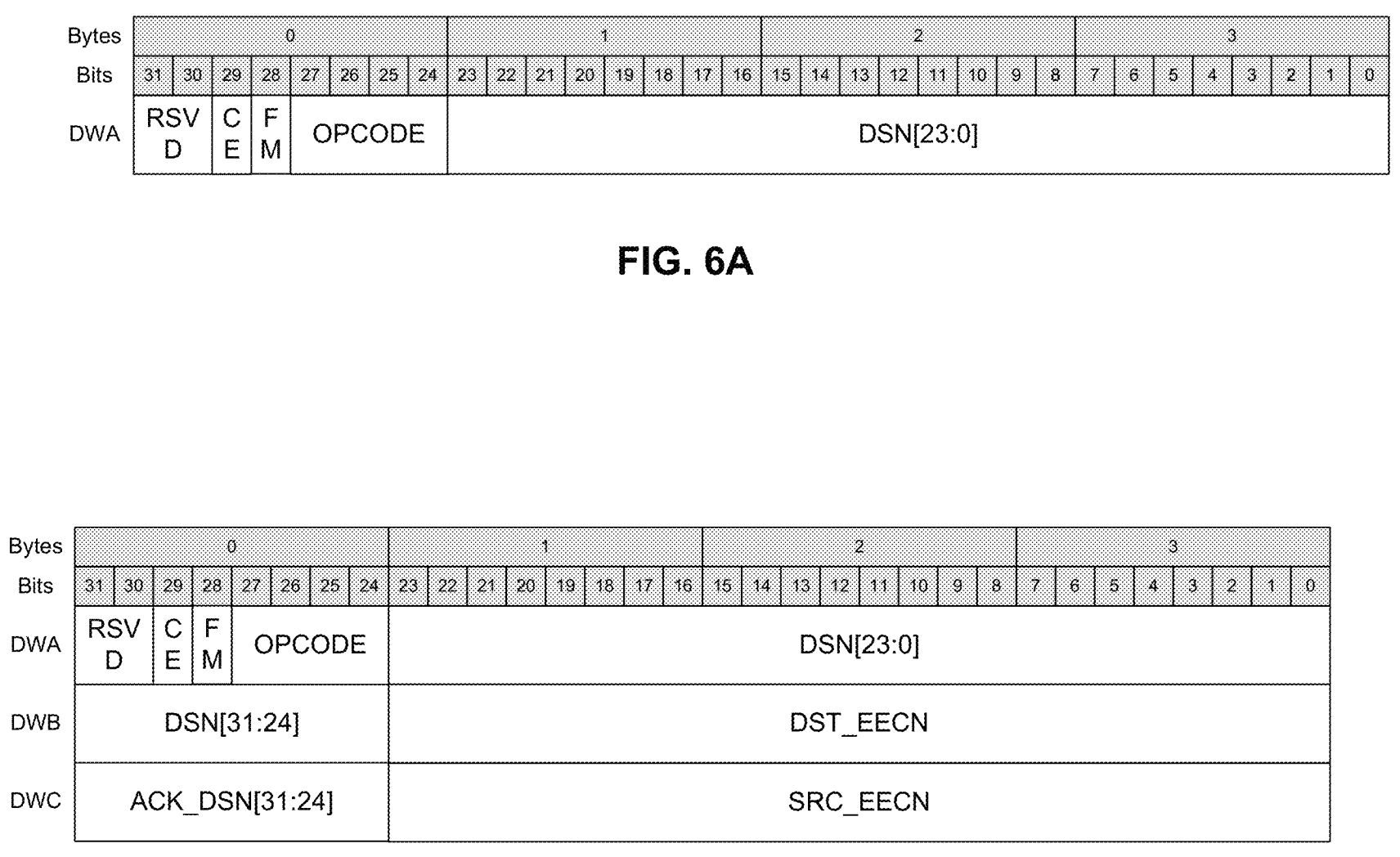

FIGS. 6A-6B depict examples of RTH formats. FIG. 6A depicts an example of RD, RD_RA, SA_ACK_ONE, SA_ACK_UPTO, UD (FORMAT=0). FIG. 6B depicts an example of RD, RD_RA, SA_ACK_ONE, SA_ACK_UPTO, UD (FORMAT=1).

FIGS. 6C-6D depict examples of RTH Formats with Piggyback Ack or Full Ack. FIG. 6C depicts an example of RD_PB, RD_RA PB, FULL_ACK (FORMAT=0). FIG. 6D depicts an example of RD_PB, RD_RA PB, FULL_ACK (FORMAT=1).

Figures 6E, 6F:
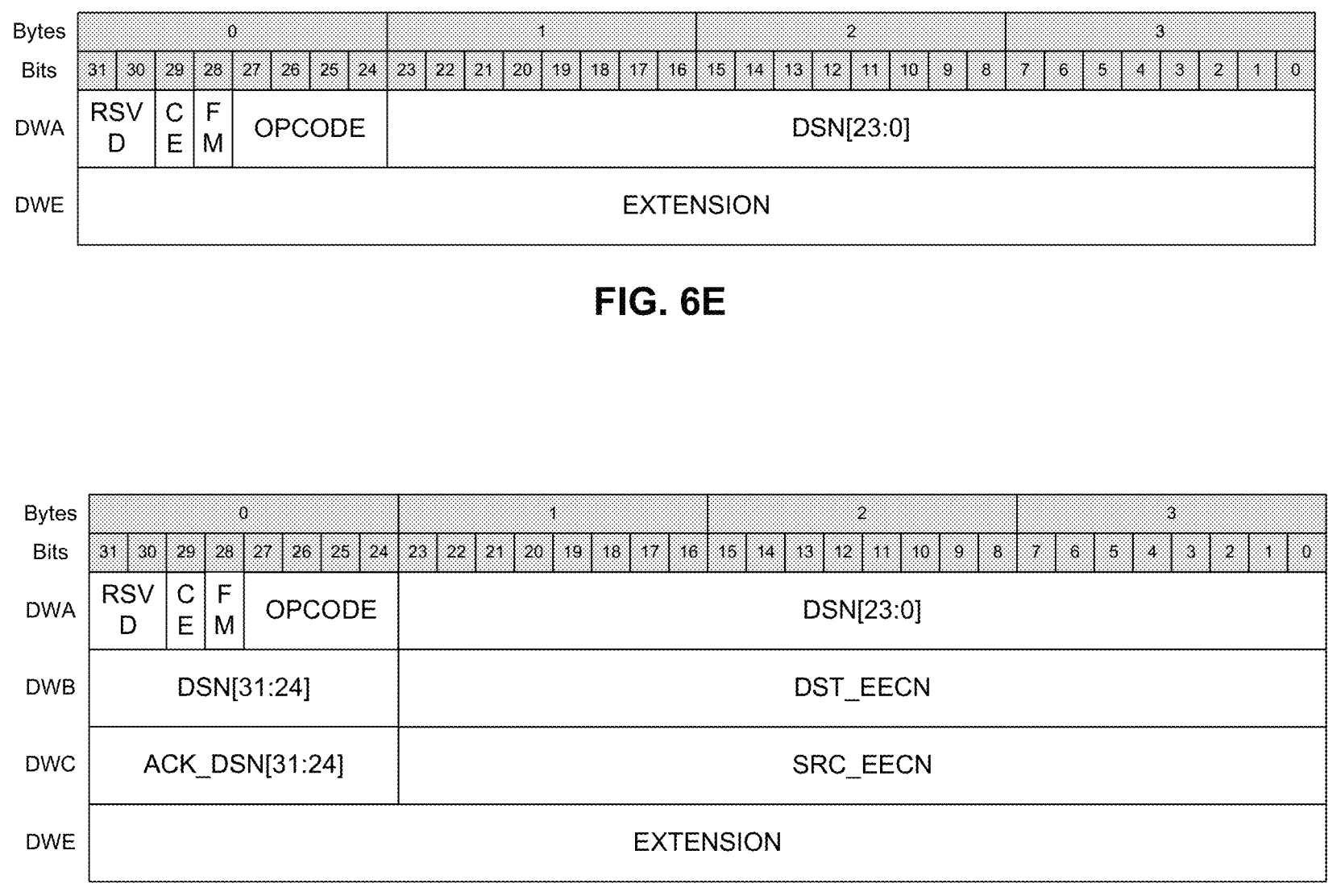

FIGS. 6E-6F depict examples of RTH Formats for Control. FIG. 6E depicts an example of RCD, UCD (FORMAT=0). FIG. 6F depicts an example of RCD, UCD (FORMAT=1).

Datagram Sequence Numbers

RT can use a Datagram Sequence Number (DSN) to specify the datagram send order on an ECC. A DSN can be used to detect datagram loss and to arrange for retry of lost datagrams. A sequence number field can roll over from the highest possible value back to 0 upon overflow. Reuse of sequence numbers can lead to a concern that different datagrams with the same number could be aliased leading to incorrect behavior at the target. For example, datagram retry leads to two (or more) instances of a particular sequence number in the network and only one of these can be consumed and delivered by the target (due to the deliver once or fail semantic). Other instances could be delayed for a substantial amount of time, for example due to a downed link or congested path, and when a delayed datagram becomes unblocked and arrives at the target it can be aliased with a future datagram that happens to use the same sequence number (e.g., zombie). This can lead to the wrong datagram being delivered and silent data corruption. Similarly, acks can be highly delayed and potentially become aliased resulting in a datagram being acked incorrectly.

Some examples size the sequence number field such that zombies can be guaranteed to age out of the network before rollover occurs by applying packet timeouts in the network to bound worst-case packet lifetime, applied per switch hop. Over multiple product generations the sequence number protection can be eroded due to scaling of link bandwidth and packet rate. For example, 1 additional bit of sequence number space can be "consumed" for every packet rate doubling. Packet rate per EECN in RT can be very high due to HL multiplexing of different higher-level connections down to a small number of EECNs. Also, there can be emerging use cases such as partitioned global address space (PGAS) programming models for High performance computing (HPC), graphics processing unit (GPU) and artificial intelligence (AI) machine learning (ML)/deep learning (DL) workloads that can be driving extreme packet rate.

The rollover problem can be addressed by RT using a 32-bit DSN capability in addition to the more common 24-bit DSN capability (as used in InfiniBand/RoCE/RoCEv2 protocols). The DSN mode can be selected using the FORMAT field in the RTH, and the capability can be configured as described herein. FORMAT 0 can use 24-bit DSNs giving $2^{24}$ distinct datagram numbers before roll-over (over 16 million). FORMAT 1 can use 32-bit DSNs giving $2^{32}$ distinct datagram numbers before roll-over (over 4 billion). The 32-bit DSN gives significant relief to aging out packets in the network. For example, assuming an extreme packet rate of 1 billion packets/second, packet lifetimes need only be bounded to 4 seconds with 32-bit DSN compared to just 16 ms with 24-bit DSN.

In 24-bit DSN mode, DSN[23:0] can be present in DWA and ACK_DSN[23:0] in DWC. In 32-bit mode, these fields can be extended using DSN[31:24] in DWB, and ACK_DSN[31:24] in DWC. An RT endpoint implementation supporting 32-bit mode can use a contiguous 32-bit DSN value internally, and extract/insert as required to map to the non-contiguous fields in the RTH formats.

DSN Space

DSN space can be independent per EEC. A number of bits in DSN can be denoted as B, so DSN space contains a total of $2^B$ DSN values. DSN math can be performed modulo $2^B$ such that DSN can be always in the range of $[0, 2^B-1]$. e.g., the value of $2^B-1$ increments to 0. In this section, mathematical operators (such as additions and subtractions) imply modulo $2^B$ arithmetic.

DSN comparison can be defined as follows:
X<Y can be defined as $0<X-Y<2^{B-1}$
X>Y can be defined as $0<Y-X<=2^{B-1}$ The next DSN (N) can be the oldest DSN that has not yet been delivered at the target. Once that DSN can be delivered at the target, the next DSN increments. Future DSNs can be in the range $[N+1, N+2^{B-1}-1]$ while past DSNs can be in the range from $[N-2^{B-1}, N-1]$.

TABLE

| DSN Space Parameters | | |
|---|---|---|
| | FORMAT = 0 | FORMAT = 1 |
| Number of DSN bits (B) | 24 | 32 |
| $2^B$ | 16,777,216 | 4,294,967,296 |
| $2^{B-1}$ | 8,388,608 | 2,147,483,648 |
| Entire DSN range | [0, 16,777,215] | [0, 4,294,967,295] |
| Range of past values, relative to N | [N − 8,388,608, N − 1] | [N − 2,147,483,648, N − 1] |
| Range of future values, relative to N | [N + 1, N + 8,388,607] | [N + 1, 2,147,483,647] |

An initiator can send one or more datagrams to a target. Target can send to the initiator one or more ACKs/NACKs as described herein. A DSN can represent a sequence number. Target can be prepared to receive window of sequence numbers. A window can be represented as data or bitmap to track sequence numbers not-delivered to next layer. Not-delivered could be received packet but may not be delivered to next layer. As oldest sequence numbers are delivered to next layer, window can move.

Bitmap (W) can be of limited size such as 24 or 32 bits. Bitmap can be divided dynamically among connections. Size of window can be 1, which uses go back N (Infiniband) OR when size of window>1, then provide out of order delivery and NACK everything before it. Some connections can operate in go back N others operate in out of order delivery. Window bitmap can represent multiple gaps in non-delivered packets. Wrap around arithmetic can be used for DSN space for target window.

The target maintains a target receive window of W DSN values that defines the range of DSNs that the target can be able to deliver. It allows the NAK/retry round-trip delay to be hidden to maintain datagram pipelining and allows the use of selective retry rather than GBN retry. As the window size can be reduced and approaches a single entry, the behavior and performance of the protocol in retry scenarios reverts to GBN retry. It can be always desirable to mitigate datagram loss through other approaches, and this can also reduce a potential need to support large W.

If the first DSN in the window can be denoted N (the next DSN), the window range can be represented by [N, N+W−1]. The value of W may be required to be in the range [1, $2^{B-1}-1$]. When W can be 1 the target can only deliver the next DSN. This provides strict ordering with behavior comparable to the standard GBN protocol. When W can be greater than 1, the target can be able to deliver the DSNs in the window in whatever order they arrive, and this can be called relaxed ordering. The W parameter sizes a bitmap at the target allowing the target to precisely track the set of datagrams that have been delivered to ensure the deliver once or fail semantic. The window contains just 1 bit of state per DSN and can be therefore very space efficient compared to buffering out-of-order datagrams.

The DSN space as viewed by the target can be shown below. The green can represent the target receive window and shows the range of DSNs that can be delivered by the target. The red can represent past and future DSNs that cannot be delivered by the target. In the limiting case of W equal to $2^{B-1}-1$, the target can be able to deliver any future DSN regardless of datagram arrival order, and the future DSNs red does not exist. The past DSN can occupy half of the total DSN space and provides protection from duplicate or zombie packets.

Figure 7:
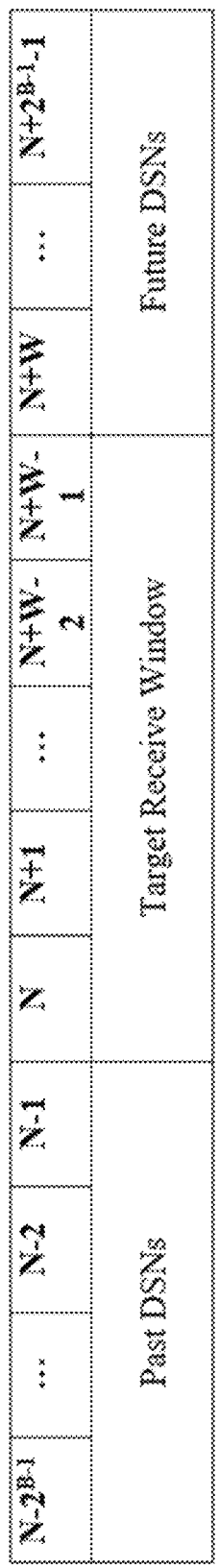
FIG. 7 depicts an example of sequence numbers.

FIG. 7 depicts an example of DSN space. The target behavior for a datagram received with DSN X while the target has a next DSN N can be as follows. If X<N, this datagram can be a duplicate. It shall not be re-delivered but can be ACKed.

If X can be in the range [N, N+W−1], the datagram can be in the scope of the window. If the window bit can be already set the datagram can be a duplicate and can be discarded without execution but can be ACKed. If the window bit can be clear the datagram can be delivered to HL, and the bit can be set (these two operations can be indivisible with respect to subsequent incoming datagrams). If the datagram can be delivered, N can be updated to the oldest DSN value that has not yet been delivered at the target. If N has changed value, the window range can be now updated to a new [N, N+W−1] and the bits in the window can be effectively shifted to discard bits that now correspond to past DSN space (e.g., before N) and filling new window bits with 0.

If X>N+W−1 this can be a future datagram that can be beyond the window, and the target discards the datagram without execution. This causes a SEQ_NAK and triggers the retry protocol described herein.

These rules can apply to strict ordering and relaxed ordering modes. The difference between them can be captured by whether W can be 1 (for strict ordering) or greater than 1 (for relaxed ordering). An implementation can cover both modes with common logic with behavior determined by the chosen value of W for that connection. The value of W can be specified by the target on a per-connection basis.

In the case where W can be 1, the window closes down to just the next DSN giving the usual in-order behavior with GBN retry where arriving future datagrams can be always discarded and retried. An implementation that only supports strict ordering can hardwire W to 1 and there can be no need to implement any bitmap state at all for window tracking. This can be because the first entry in the window, corresponding to the next DSN, can be always 0 to indicate that the next DSN is not delivered, and therefore no state can be ever required for bit 0.

When using relaxed ordering, the value of W can be greater than 1 and the actual W value can be implementation defined. Two target sides in a connection may use a different W value. For bandwidth reasons it can be recommended that W can be sized to at least (BW*RTT)/max_datagram_size so that the window allows for arbitrary datagram arrival within the bandwidth delay product for maximum sized datagrams while maintaining full bandwidth. For datagram rate can be highly desirable to consider (BW*RTT)/min_datagram_size, though this can lead to a much larger value of W.

If the value of W is not known to the initiator, the target can vary its value dynamically on a connection. Target implementations may use (and can be encouraged to use) techniques to increase the effective value of W on high rate EECs, for example, an implementation can dynamically adjust W according to datagram rate or an implementation can implement the window state as a cache giving higher performance for cached window state than for uncached window state.

Figure 8A:
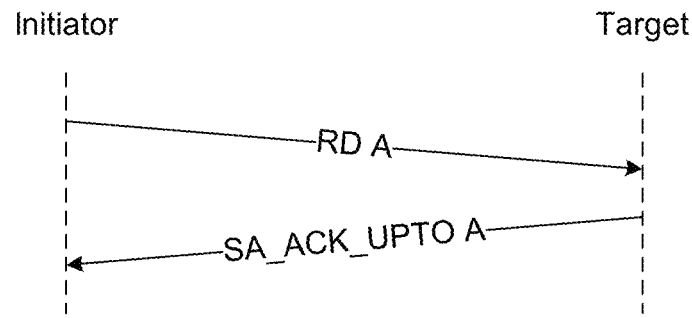
FIGS. 8A-8D depict examples of Reliable Datagram (RD) and ACKs.
Figure 8B:
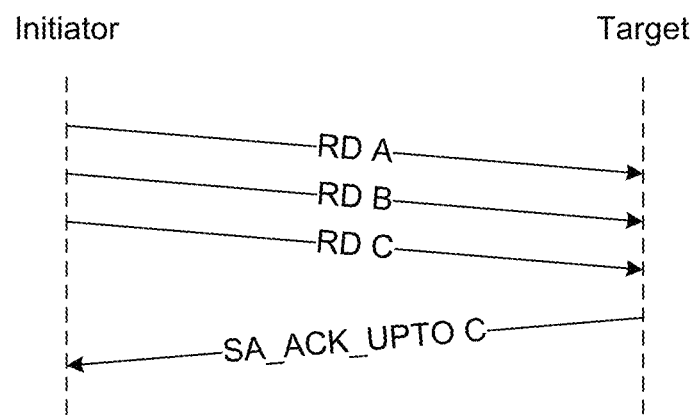
Figure 8C:
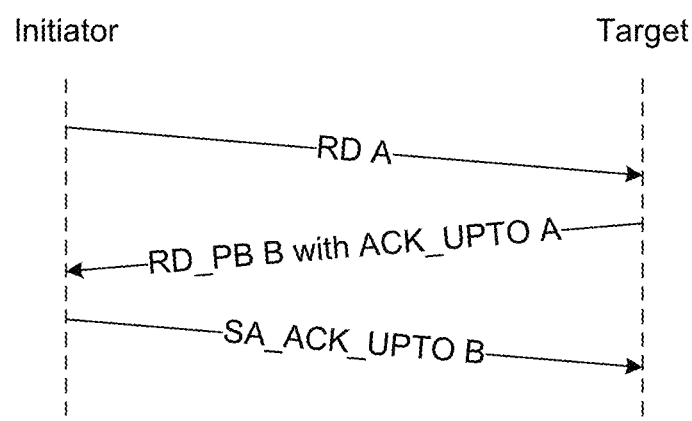
Figure 8D:
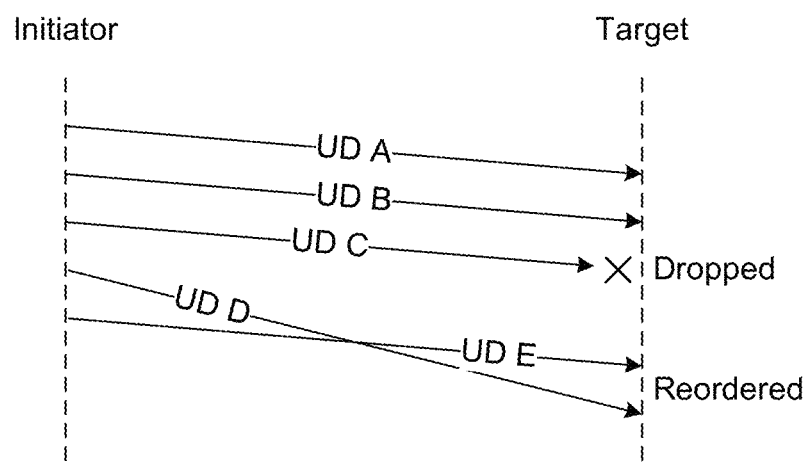

FIGS. 8A-8D depict examples of RD and ACKs. FIG. 8A depicts a single RD and ACK. FIG. 8B depicts three RDs and coalesced ACK. FIG. 8C depicts RD (e.g., an HL request), RD (e.g., an HL response) with piggyback ACK, followed by ACK. FIG. 8D depicts a sequence of UD requests experiencing drops and reordering—RT reliability protocol can be bypassed.

When using strict ordering, datagram drops can be recovered using GBN protocol. The NAK can indicate a first datagram that was dropped and implicitly acknowledge all earlier datagrams. Retry can start at that dropped datagram and all subsequent datagrams can be retried. The ack behavior continues including ACK coalescing. After the target has sent a NAK, it can receive the next expected datagram before additional NAKs can be generated to attempt to reduce a possibility of a "NAK storm" leading to multiple retry attempts following a dropped packet.

Figure 9A:
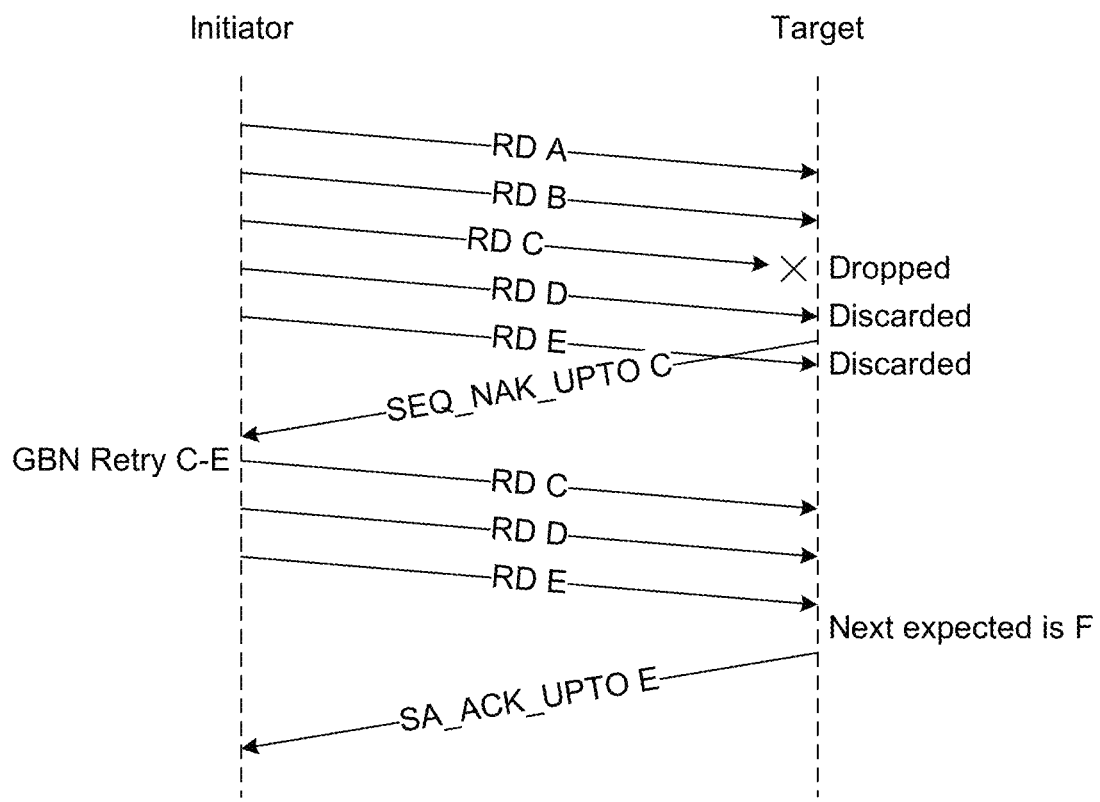
FIG. 9A depicts an example of datagrams with a datagram drop and retry.
Figure 9B:
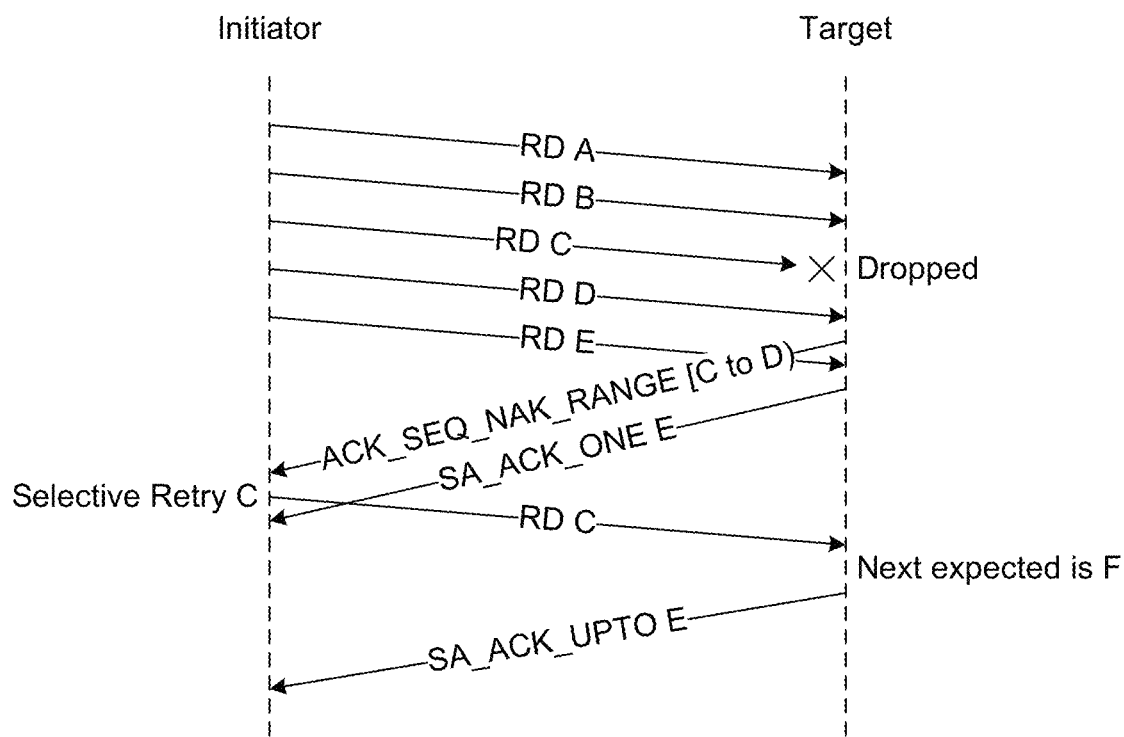
FIG. 9B depicts an example of datagrams with a datagram drop and selective retry.

FIG. 9A depicts an example of 5 datagrams with a datagram drop and Go-Back-N (GBN) retry. FIG. 9B depicts an example of 5 datagrams with a datagram drop and selective retry. For GBN replay, tracking a gap in received packet sequence numbers can occur by tracking head and tail pointers. When using relaxed ordering, datagram drops can be recovered using selective retry. When a datagram arrives at the target that is not the next expected DSN but can be within the window, the target can send back an ACK_SEQ_NAK_RANGE to initiate selective retry. The ACK_SEQ_NAK_RANGE indicating the next expected DSN and this implicitly acknowledges previous datagrams.

Additionally, this NAK can include the DSN of the received future datagram so that it can be positively acknowledged since it was delivered to the target (and not discarded). A subsequent future datagrams in the window that is not the next expected datagram can be responded to with ACK_ONE or can be opportunistically coalesced using ACK_RANGE. The overall effect can be that gaps in the target's window can be communicated back to the initiator to trigger selective retry. The initiator can retry only the explicitly NAKed datagrams and/or timed-out datagrams. After those datagrams have been retried, future datagrams may be sent. Once the retries cause the target to catch back up again (e.g., resolving all past missing datagrams up to the next expected DSN) the target returns to the usual behavior.

ACK Coalescing

ACK coalescing reduces the overheads of the reliability protocol. One or more of the following can be supported: (a) Consecutive ACKs (e.g., runs of positive ack) can be coalesced using the ACK_UPTO feature; (b) Common ACK cases can be encoded using SA_ACK_ONE and SA_ACK_UPTO using a very dense DWA encoding; (c) NAKs can be less common and can be encoded using the DWD format allowing for inclusion of a NAK code; or (d) ACKs can opportunistically be piggybacked into datagrams travelling in the opposite direction on the same connection. As an example, a common HL idiom can be the request/response protocol, and the ACK for the request can be piggybacked onto the response. The ACK for the response can potentially be piggybacked onto subsequent requests.

To provide timely acknowledgment of datagrams, the ACK can be often used to trigger HL completion of the datagram allowing HL resources to be recovered. Also, round-trip time may be measured around the datagram and ACK loop as the input signal to the congestion control algorithm.

Some examples can use an ACK coalescing timeout to specify the maximum amount of time that an ACK can be held at the target waiting for coalescing and/or piggyback opportunities before being sent as a standalone ACK. This timeout might be in the low to mid hundreds of nanosecond range—enough time to uncover an interesting number of pipelined datagrams on the same connection, and enough time to cover host and memory round-trip time (e.g., to cover read request/response). The request ACK (RA) feature can be specified by the initiator as a hint to the target to reduce or eliminate this timeout for cases where ACK return latency can be particularly critical. Once an ACK has been scheduled it can spend some time in an egress queue while arbitrating for the link. Some examples may also use this queuing delay for more opportunistic coalescing. For example, the ACK can be scheduled and then just before being committed into the pipeline for send, it can re-read the connection state to observe the next expected DSN value leading to more coalescence. In some examples, ACKs can be prioritized to reduce the round-trip time from datagram send to datagram completion.

Last Packet

A receiver may not be able to discern a last received last packet versus a large packet sequence gap. In some examples, initiator (sender) tracks outstanding datagrams (O) on a connection=[number of packets sent−acknowledged]. A last datagram can be identified by L, a number of consecutive lost last datagrams. When O and L are within a range, a retry time can be set lower to cause packet faster resend. When a connection has outstanding packets<parameter, then retransmit first datagram that was not acknowledged within shorter timer. A "Fast RTO timer" can be used by a transmitter when close to last packet. Retransmit of datagram can be limited to O.

A common issue in reliability protocols can be how to efficiently handle the loss of "last" packets. This can be the scenario where a run of datagrams ends, and there can be packet loss impacting some number of last datagrams or their ACKs such that there can be no subsequent datagrams or ACKs to reveal the packet loss expediently. The packet run may end because there can be no more datagrams to be sent by the HL (for some period of time), or because there can be a dependency at the HL such that subsequent datagrams is not sent until earlier lost datagrams can be completed. Some examples of SPARTAN recover from these scenarios using an initiator timeout which causes a retry when no progress has been made before the expiration of the timeout. The issue can be that retry timeouts can be set relatively high, much higher than RTT, to avoid spurious retries. This leads to a large opportunity loss for sending bandwidth while waiting for recovery. In "non-last" scenarios, subsequent datagrams or ACKs can be pipelined behind the dropped packets, and these reveal the packet losses to the endpoint so that recovery can be achieved without incurring a retry timeout.

Some examples of SPARTAN can use implementation-defined heuristics to optimize the initiator time-out in last packet scenarios, and trigger retry more aggressively but while moderating retry bandwidth consumption. For example, the implementation can track the number of outstanding datagrams (O) on a connection. The implementation can have a configuration parameter of the number of consecutive lost last datagrams (L) to optimize recovery for. For example, L could be 1 to for just one last datagram, or a small number to optimize recovery for L consecutive last datagrams (or their ACKs) being lost. When O can be in the range [1, L], the retry time-out can be reduced to a lower value, for example RTT plus some margin ($RTO_{fast}$). If an ACK is not received by the initiator in that shorter timeout, then retry can be initiated for the L datagrams.

When O can be greater than L, the normal retry timeout value can be used ($RTO_{slow}$), much larger than RTT. The probability of more than L last packets being all dropped can be considered much less likely to occur in random drop scenarios. Of course, this could occur in consecutive drop scenarios occurring to congestion or down links, but these scenarios can be covered by orthogonal mechanisms (e.g., congestion control and multi-pathing). The values of L, $RTO_{fast}$ and $RTO_{slow}$ can be tuned to trade-off the latency of recovery from dropped lost packets versus the bandwidth used for unnecessary retry. The maximum number of datagrams that can be retried opportunistically using $RTO_{fast}$ can be limited to L, so L provides a way to trade-off between bandwidth and tail latency.

Initiator timeout can also be invoked due to dropped NAKs even in non-last packet scenarios. The reliability protocol can be designed to not send redundant NAKs since these would lead to excessive retry. When using relaxed ordering, the protocol can perform selective ACK allowing the number of outstanding datagrams to be reduced at the initiator, and this can potentially lead to faster recovery from dropped NAKs once the number of outstanding datagrams reduces to L or less. When using strict ordering, GBN retry can be used and retry timeout can be necessary to recover from dropped NAKs.

Failover Support

The RT protocol can be capable of supporting failover. For example, if multiple ports are supported with connectivity from the RT instantiation to multiple ports, if a port fails, the traffic on RT connections can be migrated from the failed port to the new port and the EEC is to be reconfigured to use the new port for subsequent sent packets. This migration could be implemented using a combination of hardware be and firmware be behavior depending on the implementation.

A fabric can support multiple paths between source and destinations. If an inter-switch link fails, the switch routing tables can be reprogrammed to migrate traffic to other available routes.

These failover events may trigger transitory packet loss or packet reordering and the RT protocols can appropriately ride through this with a transitory performance impact. The RD protocol can recover from dropped and reordered packets and continue to deliver the same semantics to HL. If there can be no possible path from source to destination then RT operations can fail at the initiator, due to exceeding a threshold number of retry timeouts, with an error indication.

Reliability Protocol Example

The initiator can maintain one or more of the following state per outstanding datagram: (1) DSN of the outstanding datagram; (2) state to allow that datagram to be reconstructed for a retry, including addressing, headers and payload; (3) state to indicate whether that datagram has been ACKed; or (4) state to indicate whether that datagram has been NAKed. This can be to support selective retry.

State to indicate whether that datagram has been ACKed may be implicit for implementations that complete an outstanding datagram as soon as it has been ACKed. In some examples, by maintaining an explicit bit per outstanding datagram and arranging that datagrams can be removed from the outstanding datagram tracking structure in original send order at the initiator, the tracking mechanism can be simplified to a structure that can be linear with DSN allowing a lookup by DSN when processing acks.

The initiator can maintain an initiator timeout value to ensure that datagram loss can trigger a retry. In some examples, a single timeout value can be used for the entire EEC or a separate timeout per outstanding datagram. In GBN protocols, a transport timer (as described in the InfiniBand/RoCE specification) per EEC works well. When a datagram can be sent and the timer is not set, the timer can be set to the current time plus RTO. When a datagram can be sent and the timer has already been set, the timer may not be modified. The timer can be set with a value appropriate to the oldest outstanding datagram in a pipeline of datagrams. When an ack can be received that completes a datagram and there can be no outstanding datagrams, the timer can be cleared. However, when an ack can be received that completes a datagram and there can be outstanding datagrams, the timer can be set to the current time plus RTO. The initiator timeout can expire, and invoke GBN retry, when RTO time (or more) has passed since a datagram was sent and no acks have been received that completed datagrams. An implementation of RT strict ordering mode can use this initiator timeout scheme.

In RT relaxed ordering mode, an ACK can be received and processed by the initiator out of order. The timer may not be set to the current time plus RTO since this would cause the calculated timeout of prior datagrams to be skipped. For example, if a datagram can be sent but dropped in the network, a stream of subsequent datagrams and their ACKs may not repeatedly set a new timer value per ACKed DSN to "starve" the dropped datagram until the outstanding pipeline has been completely filled and timed out.

In some examples, a new timer value can be set when or after the oldest outstanding DSN is completed. A separate timeout value per outstanding datagram can be calculated from the datagram send time plus RTO. When datagrams can be completed, the timer can be updated to the timeout value of the oldest outstanding datagram or cleared if there can be none. There can be no need to insert every datagram into a ordered timeout list since only the timeout of the oldest datagram can be needed for reasonable timeout behavior for the whole EEC. The per-datagram timeout values can be held in the state per outstanding datagram previously described.

The target can maintain the target receive window according to the arriving datagrams. Target can determine the appropriate ACK/NAK sequence to return in order to inform the initiator when to enter selective retry and when to complete datagrams. There can be a wide variety of different ACK/NAK encodings available, and various optimizations that the target can use to reduce the bandwidth that can be consumed on the return path.

When using strict ordering, the target sends ACK_UPTO and NAK_UPTO. For example, where D can be the DSN of the received datagram and N can be the next expected DSN for the target whereby datagram math can be performed using modulo arithmetic:

D<N: the datagram can be a duplicate and can be discarded. The target returns ACK_UPTO(N−1) to update the initiator that all datagrams have been delivered up to and including N−1.

D==N: the datagram can be the next expected DSN and can be delivered. The target schedules an ACK_UPTO(N) and this may be coalesced with other ACKs. The target advances N to N+1.

D>N: the datagram can be in the future space. This can be a sequence error and indicates that datagrams were dropped. The target schedules a SEQ_NAK_UPTO(N) indicating that all datagrams have been delivered up to and including N−1, that N can be the next expected datagram, and that the target has experienced a sequence NAK. The NAK can be sent as soon as possible, subject to arbitration with other send packets. It can be important for the target to not send redundant NAKs since these lead to redundant selective retry with a potentially significant impact on bandwidth and forward progress. Once a NAK can be scheduled, no subsequent NAK can be scheduled until N can be advanced (due to a datagram being received with the next expected DSN). This "interlock" requires state to record that a NAK has been sent.

When using relaxed ordering, a set of ACK and NAK formats can be available. A target may choose a subset of the ACK/NAK formats to send according to its implementation-specific algorithms. However, initiator implementations can support relaxed ordering can be able to receive any legal ACK/NAK format for inter-operability reasons. Differences in ACK/NAK behavior, relative to the GBN behavior above, can be due to the handling of datagrams arriving within the DSN window of W datagrams. This window can be denoted [N, N+W−1] and the required behavior of the window itself can be described in the DSN Space section.

Example Operation

FIGS. 10A-10I depict example states a window with an example window size (W) of 20. The first row of each of FIGS. 10A-10I shows DSN offsets relative to N, the next expected DSN and the second row shows the bits in the window with "1" indicating that that DSN was delivered and "empty" indicating not delivered (0). In this example, prior packets have been delivered and are not part of the window, while future packets (beyond the window) have not been delivered and are not part of the window. A cell marked 'D' represents an arriving datagram causing that cell to change from 0 to 1. Black colored cells represent DSNs that can be NAKed and light gray cells represent DSNs that can be ACKed, both as a consequence of the arrival of D. The third row of each of FIGS. 10A-10I, where present, indicates a specific ACK/NAK opcode and fields that can be returned by the target following the arrival of D.

ACKing a consecutive range of DSNs marked as "1" in the window can occur to allow proceeding through dropped ACKs. A DSN can be NAKd once. For example, the target may NAK a DSN for a second time once the target has determined that the initiator has attempted selective retry, e.g., by detecting that the arriving DSN has rolled backwards. Multiple NAKs can cause the initiator to rewind and retry multiple times leading to excessive retry and lower performance due to repeated sends of the same datagram.

In some examples, where D<N or D==N, GBN can be applied.

In some examples, where D>N and D<N+W, ACK/NAK behavior can vary as DSNs accumulate in the window and create runs of dropped datagrams and delivered datagrams that are to be NAKed and ACKed respectively. For new sends, the datagram numbers can ascend through the window, potentially with drops. For selective retry sends, the initiator can rewind its next DSN due to a NAK leading to retried datagrams that may fill in the gaps, or be duplicates, or potentially dropped in the network again. The behavior of the target can depend on the sequencing of sends, retries and drop as observed at the target, and the current state of the window.

Description next turns to an example operation. FIG. 10A depicts an empty window. FIG. 10B depicts insertion of D in the window, which indicates a first missing range after N in which datagram 4 (N+4) indicates a first missing range. In this scenario, receipt of datagram 4 occurred but datagrams 0 to 3 (N+0 to N+3) were not received. This can be a gap of 1 or more missing DSNs in the range [N, D−1]. The target can send ACK_SEQ_NAK_RANGE(N, D) to ACKs datagrams less than N (since N can be the first missing), NAKs the range from [N, D−1] and ACKs D to capture a range of delivered and missing datagrams to initiate selective retry for the missing range. In some examples, one first missing range can occur at a time. When this first missing range becomes filled by retried datagrams, the window can be shifted resulting in a new value of N, and then a new first missing range can arise. This interlock can provide protection against redundant NAKs.

FIGS. 10C and 10D depict the arrival of respective N+5 and N+6, which extends a run of delivered datagrams after the first missing range, and updates D to be at N+6. The target can send an ACK_ONE(D) to ACK just that datagram, or implement ACK coalescing to coalesce this using ACK_RANGE(D1, D2) where D1 to D2 indicates the coalesced contiguous run of successfully received datagrams. Receiver NIC can ACK datagrams (4-6) by sending ACK_RANGE (4, 6) ACKs can be coalesced based on timer expiration in some examples. A double ACK of datagram 4 is permitted. At this point, only one gap (0-3) outstanding.

FIG. 10E depicts a window after the arrival of N+11, which causes a second range of missing delivered datagrams. In this situation, 2 gaps are outstanding. The receiver can NACK datagrams (N+7 to N+10) and ACK N+11. This arrival terminates the previous run of delivered datagrams, and any ACK coalescing for that run can be flushed causing the ACK_ONE or ACK_RANGE to be scheduled. The target scans back from D to find the number of consecutive, dropped datagrams. This can be used to return SEQ_NAK_RANGE(D1, D) which indicates that datagrams from [D1, D−1] can be NAKed, and datagram D can be ACKed. This NAK does not contain an "UPTO" side-effect since this NAK range can be discontiguous from N. Since SEQ_NAK_RANGEs can be a precise and bounded range, and since the target has progressed from that range and has no reason to NAK that range again, there can be no need for a NAK interlock.

FIG. 10F depicts subsequent arrivals that extend a run of delivered datagrams to N+14. FIG. 10F depicts a window after receipt of datagrams N+11 to N+14. Receiver NI can send ACK_RANGE (11, 14) to indicate receipt of datagrams with range 11 to 14.

In some examples, a limited window of received datagram state recording can be maintained such as 20 packets. In a case where D>=N+W, FIG. 10G shows a datagram in the future space where datagram N+20 is received. If the window can be in the empty state, the behavior can be the same as GBN. SEQ_NAK_UPTO(N) can be used with an interlock to allow only one outstanding NAK. This causes the initiator to retry from N at the beginning of the window.

Some examples, inform the initiator of the dropped future datagram. This can be done with SEQ_NAK_RANGE(D1+1,D) where D1 can be the last received DSN in the window, or with SEQ_NAK_ONE(D) if the last DSN in the window was already delivered. To avoid issuance of redundant NAKs, a DSN that tracks the maximum received DSN can be used. The initiator uses the future NAKs to mark the tracked datagram(s) as NAKed and it can arrange for retry after selective retry of earlier NAKed or timed-out datagrams.

FIGS. 10H and 10I depict that following a NAK, the initiator can selectively retry datagrams to fill in the gaps. The arrival of retry datagrams can lead to new ACK ONEs and ACK_RANGEs, and the target can be permitted to use ACK_RANGE to report the maximal range of consecutive delivered DSNs as holes can be filled. ACK_UPTO can move window to start at sequence 15 so that N=15.

Selective retries can themselves be dropped leading to more ACK_SEQ_NAK_RANGE and SEQ_NAK_RANGEs which can trigger additional selective retry. However, it can be possible that a selective retry can be dropped and there can be no visibility to the target that a drop occurred since selective retry can be scattered in DSN space. The target can optionally detect that selective retry has occurred due to the arriving DSN being rolled backwards compared to the maximum DSN observed by the target, and potentially use this to detect dropped selective retry and generate appropriate NAKs. Initiator timeout can be used to detect corner cases due to missing NAKs, so that forward progress can be made in some cases except when the target becomes unreachable.

Figure 11:
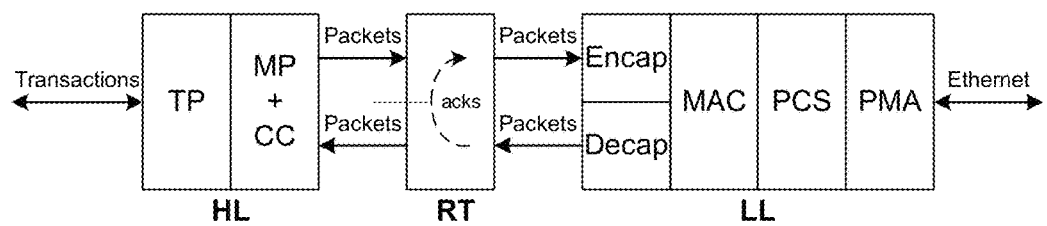
FIG. 11 depicts an example single port configuration.

FIG. 11 depicts an example single Ethernet port where LL consists of encapsulation/decapsulation (Encap/Decap), media access control (MAC), physical coding sublayer (PCS), and physical media attachment (PMA) while HL includes circuitry for multi-pathing (MP), congestion control (CC) and transaction protocol (TP).

Figure 12:
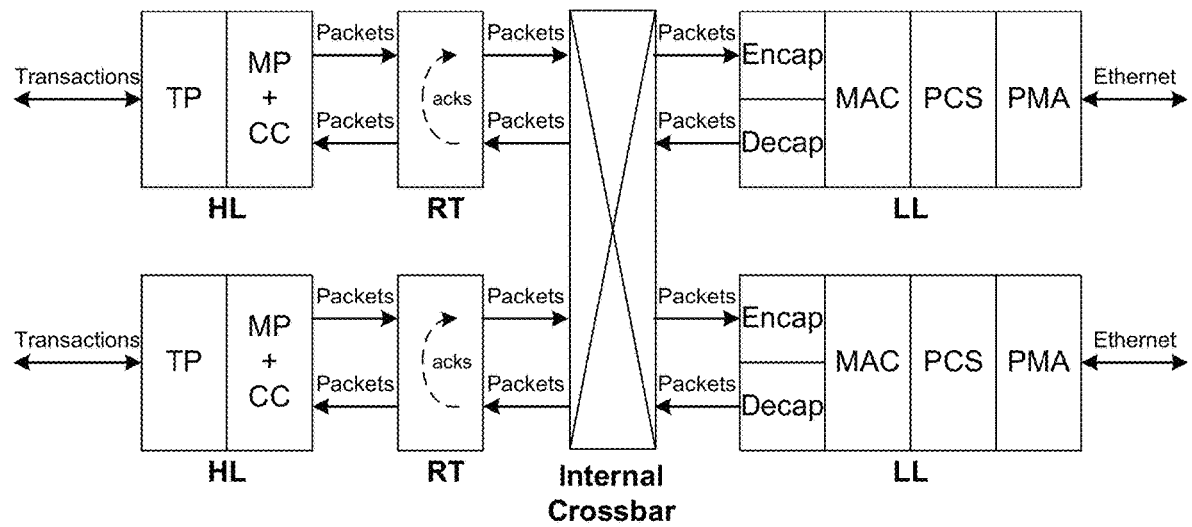
FIG. 12 depicts a use case of multiple ports configuration.

FIG. 12 depicts a use case of multiple ports using multiple LL instantiations. The HL and RT can be also replicated to give more transaction performance and concurrency. The interconnection can be achieved using an internal crossbar allowing a HL/RT pipeline to utilize any port. This formulation allows multipathing and congestion control to be solved at a higher layer allowing transactions to be packet sprayed across multiple EECs and then routed to multiple ports and multiple paths through the attached networks.

Additionally, the networks can be structured as multiple independent network planes. Another key characteristic of this particular use case can be that RT can be instantiated on the HL side of the internal crossbar allowing for a failover capability across ports. If a port fails the EECs can be reprogrammed to use the different port, and then the RT reliability protocol can ensure that packet drops can be recovered in a way that can be seamless to HL other than transitory performance effects.

The following examples are packet formats indicating how RT can be layered in a transport solution. In some cases, RT follows UDP, and the RT packet can be identified using a port number.

TABLE

Example Profiles

| L1 | L2 | L3 | L4 | | EP Address | Traffic Class | Standard Format? |
|---|---|---|---|---|---|---|---|
| Ethernet | MAC | IPv4 | UDP | RTH | HL | IPv4 | 801.Q PCP or IP DSCP | Yes |
| Ethernet | MAC | IPv6 | UDP | RTH | HL | IPv6 | 801.Q PCP or IP DSCP | Yes |
| Ethernet | MAC | — | — | RTH | HL | MAC | 801.Q PCP | Yes |
| Custom | — | IPv4 | UDP | RTH | HL | IPv4 | IP DSCP | No |
| Custom | — | IPv6 | UDP | RTH | HL | IPv6 | IP DSCP | No |
| Custom | Custom | — | — | RTH | HL | Custom | Custom | No |

Figure 13A:
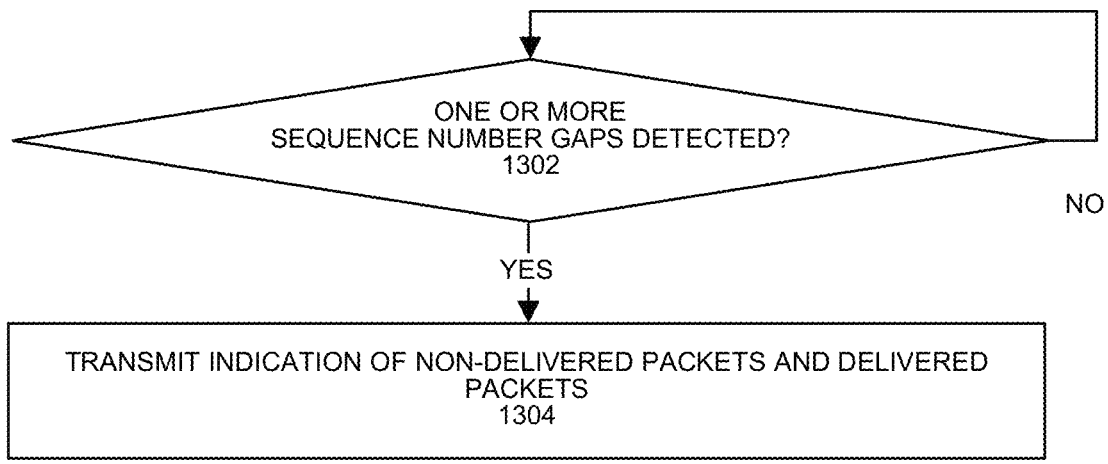
FIGS. 13A and 13B depict example processes.

FIG. 13A depicts an example process. The process can be performed by a target receiver network interface device and/or a host server in some examples. At 1302, based on receipt of one or more packets with associated sequence numbers indicative of transmit order, the network interface device can track receipt of sequence numbers and identify one or more gaps in sequence numbers. The one or more gaps can be tracked using data indicative of received sequence numbers and non-received sequence numbers. At 1304, based on a gap in sequence numbers, the network interface device can provide an indication to a sender of packets non-delivered packets to identify a range of delivered packets. For example, various packet formats described herein can be used to indicate non-delivered packets and also identify a range of delivered packets. The indication can identify a negative acknowledgement sequence range indicating a start and end of non-delivered packets. The indication can identify a range of delivered packets by providing a sequence range indicating a start and end of non-delivered packets. The indication can identify a sequence range indicating an acknowledgement up to and including a sequence number.

Note that received packets can be delivered to a processor for protocol processing. For example, protocol processing can include definition of messages, and network operation semantics; fragmentation of messages into datagrams, and reassembly of datagrams into messages; multi-pathing and load-balancing of datagrams across paths; congestion control; or quality of service management.

Figure 13B:
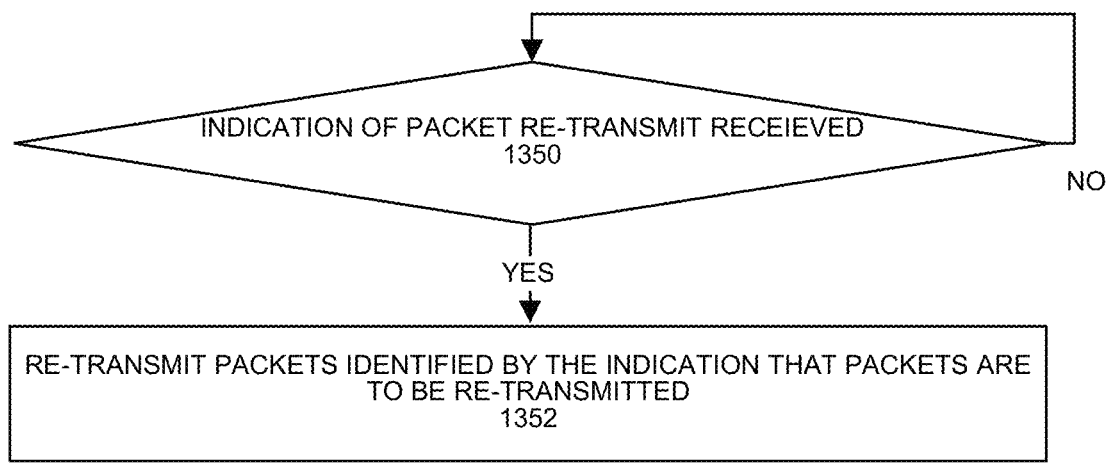

FIG. 13B depicts an example process. The process can be performed by an initiator transmitter network interface device and/or a host server in some examples. At 1350, a determination is made as to whether a re-transmit indication is received. At 1352, based on receipt of an indication of a range of non-delivered packets from a target receiver network interface device, a transmitter network interface device can re-transmit packets corresponding to sequence numbers identified in the indicated range of non-delivered packets. In some examples, the indication includes a negative acknowledgement sequence range indicating a start and end of non-delivered packets. In some examples, the indication includes a range of delivered packets comprising a sequence range indicating an acknowledgement up to and including a sequence number.

Figure 14:
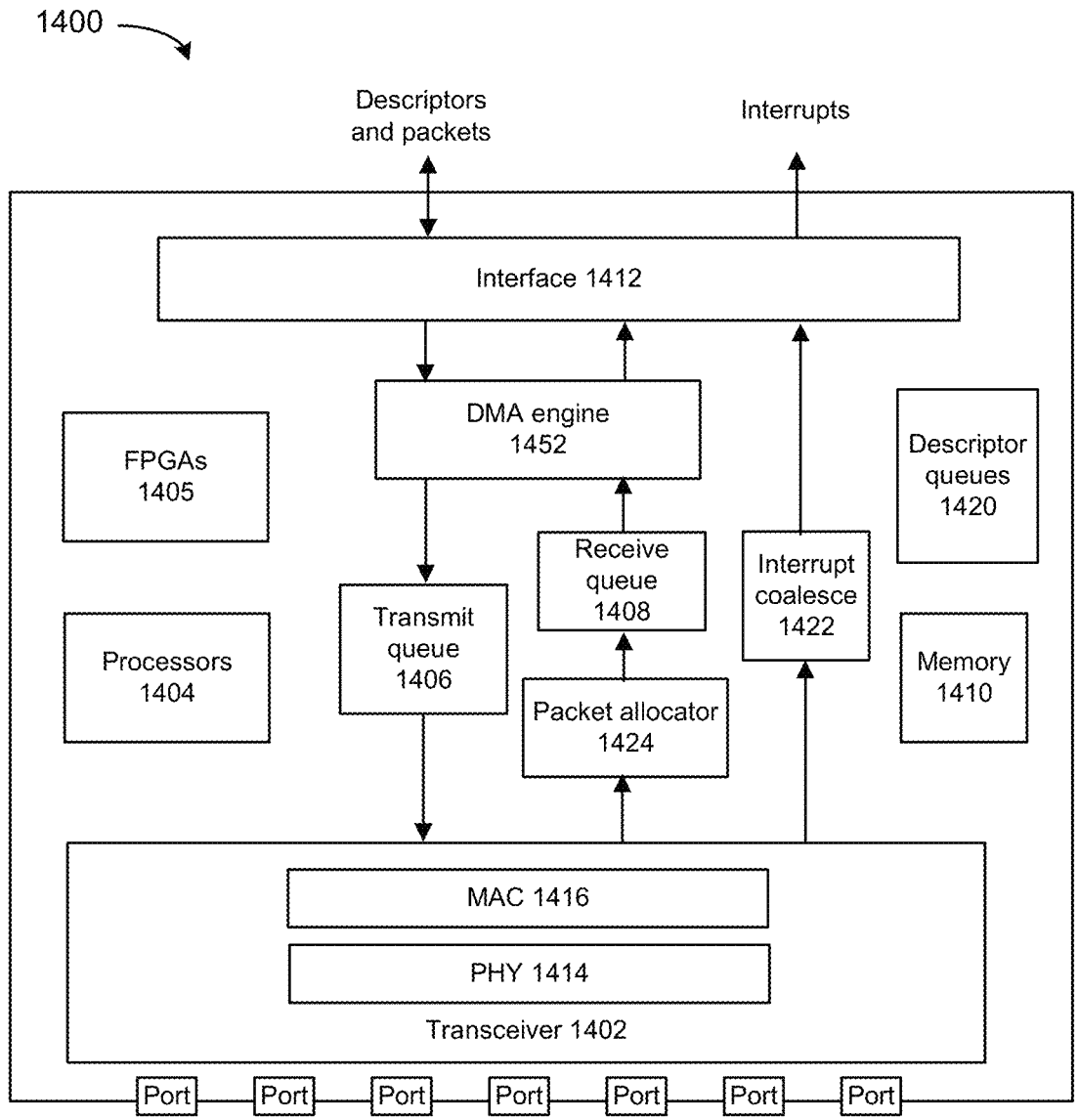
FIG. 14 depicts an example network interface.

FIG. 14 depicts an example network interface device. Various processor resources in the network interface can perform one or more of: (a) as a target receiver, tracking one or more packet gaps in received packet sequence numbers and indicating to a sender of packets non-delivered packets to identify a range of delivered packets and/or (b) as an initiator transmitter, transmitting one or more packets to a receiver and re-transmitting one or more packets based on receipt of an indication of a range of non-delivered packets or timeout, as described herein. In some examples, network interface 1400 can be implemented as a network interface controller, network interface card, a host fabric interface (HFI), or host bus adapter (HBA), and such examples can be interchangeable. Network interface 1400 can be coupled to one or more servers using a bus, PCIe, CXL, or DDR. Network interface 1400 may be embodied as part of a system-on-a-chip (SoC) that includes one or more processors, or included on a multichip package that also contains one or more processors.

Some examples of network device 1400 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 1400 can include transceiver 1402, processors 1404, FPGAs 1405, transmit queue 1406, receive queue 1408, memory 1410, and bus interface 1412, and DMA engine 1452. Transceiver 1402 can be capable of receiving and transmitting packets in conformance with the applicable protocols such as Ethernet as described in IEEE 802.3, although other protocols may be used. Transceiver 1402 can receive and transmit packets from and to a network via a network medium (not depicted). Transceiver 1402 can include PHY circuitry 1414 and media access control (MAC) circuitry 1416. PHY circuitry 1414 can include encoding and decoding circuitry (not shown) to encode and decode data packets according to applicable physical layer specifications or standards. MAC circuitry 1416 can be configured to perform MAC address filtering on received packets, process MAC headers of received packets by verifying data integrity, remove preambles and padding, and provide packet content for processing by higher layers. MAC circuitry 1416 can be configured to assemble data to be transmitted into packets, that include destination and source addresses along with network control information and error detection hash values.

Processors 1404 can be any a combination of a: processor, core, graphics processing unit (GPU), field programmable gate array (FPGA), application specific integrated circuit (ASIC), or other programmable hardware device that allow programming of network interface 1400. For example, a "smart network interface" or SmartNIC can provide packet processing capabilities in the network interface using processors 1404.

Processors 1404 can include a programmable processing pipeline that is programmable by P4, C, Python, Broadcom Network Programming Language (NPL), or x86 compatible executable binaries or other executable binaries. A programmable processing pipeline can include one or more match-action units (MAUs) that can be configured to perform one or more of: (a) as a target receiver, tracking one or more packet gaps in received packet sequence numbers and indicating to a sender of packets non-delivered packets to identify a range of delivered packets and/or (b) as an initiator transmitter, causing transmission of one or more packets to a receiver and causing re-transmission of one or more packets based on receipt of an indication of a range of non-delivered packets or timeout, as described herein. Processors, FPGAs, other specialized processors, controllers, devices, and/or circuits can be used utilized for packet processing or packet modification. Ternary content-addressable memory (TCAM) can be used for parallel match-action or look-up operations on packet header content.

Packet allocator 1424 can provide distribution of received packets for processing by multiple CPUs or cores using receive side scaling (RSS). When packet allocator 1424 uses RSS, packet allocator 1424 can calculate a hash or make another determination based on contents of a received packet to determine which CPU or core is to process a packet.

Interrupt coalesce 1422 can perform interrupt moderation whereby network interface interrupt coalesce 1422 waits for multiple packets to arrive, or for a time-out to expire, before generating an interrupt to host system to process received packet(s). Receive Segment Coalescing (RSC) can be performed by network interface 1400 whereby portions of incoming packets are combined into segments of a packet. Network interface 1400 provides this coalesced packet to an application.

Direct memory access (DMA) engine 1452 can copy a packet header, packet payload, and/or descriptor directly from host memory to the network interface or vice versa, instead of copying the packet to an intermediate buffer at the host and then using another copy operation from the intermediate buffer to the destination buffer.

Memory 1410 can be any type of volatile or non-volatile memory device and can store any queue or instructions used to program network interface 1400. Transmit queue 1406 can include data or references to data for transmission by network interface. Receive queue 1408 can include data or references to data that was received by network interface from a network. Descriptor queues 1420 can include descriptors that reference data or packets in transmit queue 1406 or receive queue 1408. Bus interface 1412 can provide an interface with host device (not depicted). For example, bus interface 1412 can be compatible with or based at least in part on PCI, PCI Express, PCI-x, Serial ATA, and/or USB (although other interconnection standards may be used), or proprietary variations thereof.

Figure 15:
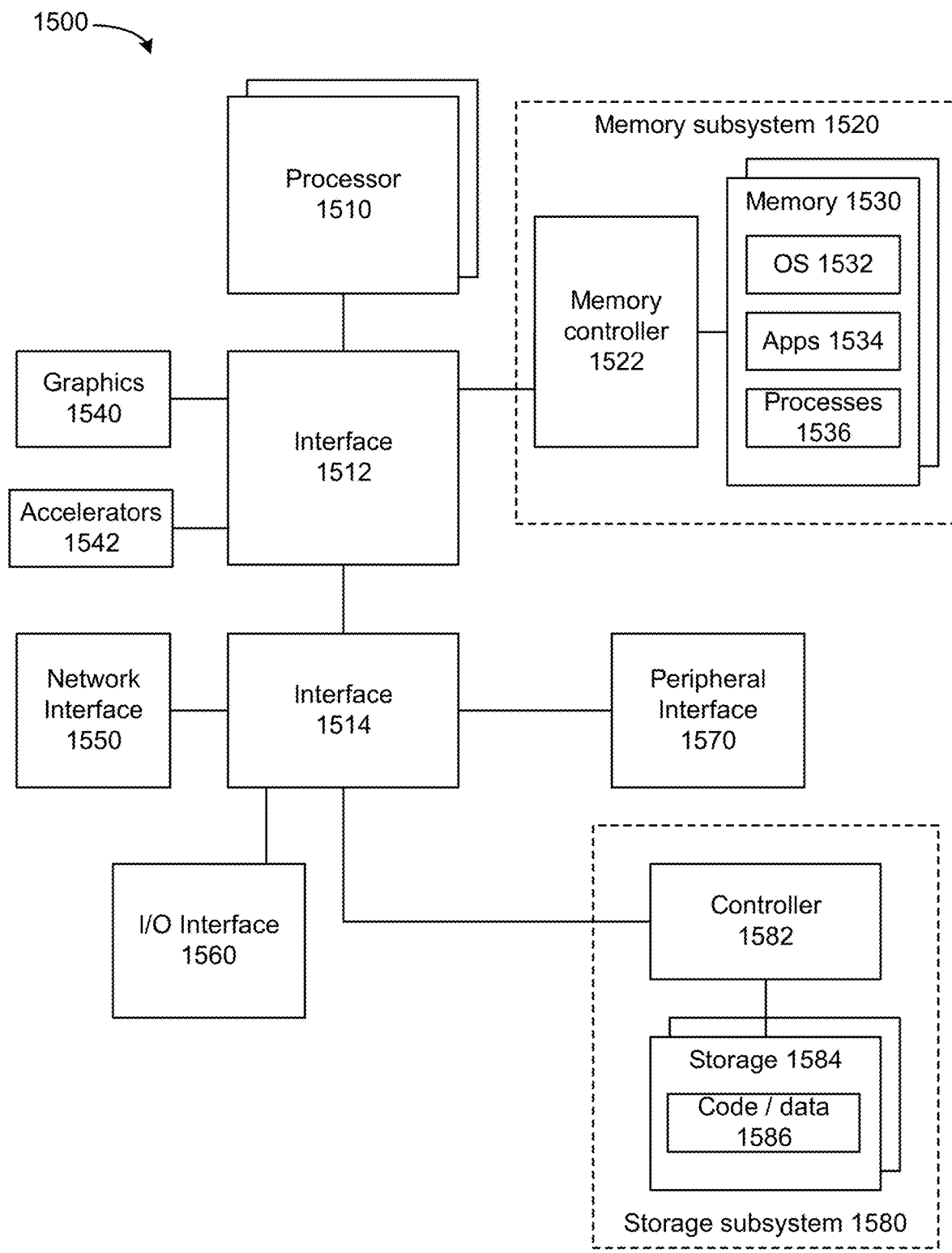
FIG. 15 depicts an example computing system.

FIG. 15 depicts an example computing system. Components of system 1500 (e.g., processor 1510, network interface 1550, and so forth) to perform one or more of: (a) as a target receiver, tracking one or more packet gaps in received packet sequence numbers and indicating to a sender of packets non-delivered packets to identify a range of delivered packets, (b) as an initiator transmitter, transmitting one or more packets to a receiver and re-transmitting one or more packets based on receipt of an indication of a range of non-delivered packets or timeout, or (c) performing packet processing such as one or more of: definition of messages, and network operation semantics; fragmentation of messages into datagrams, and reassembly of datagrams into messages; multi-pathing and load-balancing of datagrams across paths; congestion control; or quality of service management, as described herein. System 1500 includes processor 1510, which provides processing, operation management, and execution of instructions for system 1500. Processor 1510 can include any type of microprocessor, central processing unit (CPU), graphics processing unit (GPU), processing core, or other processing hardware to provide processing for system 1500, or a combination of processors. Processor 1510 controls the overall operation of system 1500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1500 includes interface 1512 coupled to processor 1510, which can represent a higher speed interface or a high throughput interface for system components that needs higher bandwidth connections, such as memory subsystem 1520 or graphics interface components 1540, or accelerators 1542. Interface 1512 represents an interface circuit, which can be a standalone component or integrated onto a processor die. Where present, graphics interface 1540 interfaces to graphics components for providing a visual display to a user of system 1500. In one example, graphics interface 1540 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1540 generates a display based on data stored in memory 1530 or based on operations executed by processor 1510 or both. In one example, graphics interface 1540 generates a display based on data stored in memory 1530 or based on operations executed by processor 1510 or both.

Accelerators 1542 can be a fixed function or programmable offload engine that can be accessed or used by a processor 1510. For example, an accelerator among accelerators 1542 can provide compression (DC) capability, cryptography services such as public key encryption (PKE), cipher, hash/authentication capabilities, decryption, or other capabilities or services. In some embodiments, in addition or alternatively, an accelerator among accelerators 1542 provides field select controller capabilities as described herein. In some cases, accelerators 1542 can be integrated into a CPU socket (e.g., a connector to a motherboard or circuit board that includes a CPU and provides an electrical interface with the CPU). For example, accelerators 1542 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 1542 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1520 represents the main memory of system 1500 and provides storage for code to be executed by processor 1510, or data values to be used in executing a routine. Memory subsystem 1520 can include one or more memory devices 1530 such as read-only memory (ROM), flash memory, one or more varieties of random access memory (RAM) such as DRAM, or other memory devices, or a combination of such devices. Memory 1530 stores and hosts, among other things, operating system (OS) 1532 to provide a software platform for execution of instructions in system 1500. Additionally, applications 1534 can execute on the software platform of OS 1532 from memory 1530. Applications 1534 represent programs that have their own operational logic to perform execution of one or more functions. Processes 1536 represent agents or routines that provide auxiliary functions to OS 1532 or one or more applications 1534 or a combination. OS 1532, applications 1534, and processes 1536 provide software logic to provide functions for system 1500. In one example, memory subsystem 1520 includes memory controller 1522, which is a memory controller to generate and issue commands to memory 1530. It will be understood that memory controller 1522 could be a physical part of processor 1510 or a physical part of interface 1512. For example, memory controller 1522 can be an integrated memory controller, integrated onto a circuit with processor 1510.

In some examples, OS 1532 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. In some examples, a driver can configure network interface 1550 to (a) as a target receiver, tracking one or more packet gaps in received packet sequence numbers and indicating to a sender of packets non-delivered packets to identify a range of delivered packets, and/or (b) as an initiator transmitter, transmitting one or more packets to a receiver and re-transmitting one or more packets based on receipt of an indication of a range of non-delivered packets or timeout, as described herein. In some examples, a driver can enable or disable offload to network interface 1550 to perform: (a) as a target receiver, tracking one or more packet gaps in received packet sequence numbers and indicating to a sender of packets non-delivered packets to identify a range of delivered packets, and/or (b) as an initiator transmitter, transmitting one or more packets to a receiver and re-transmitting one or more packets based on receipt of an indication of a range of non-delivered packets or timeout, as described herein. A driver can advertise capability of network interface 1550 to perform: (a) as a target receiver, tracking one or more packet gaps in received packet sequence numbers and indicating to a sender of packets non-delivered packets to identify a range of delivered packets, and/or (b) as an initiator transmitter, transmitting one or more packets to a receiver and retransmitting one or more packets based on receipt of an indication of a range of non-delivered packets or timeout, as described herein.

While not specifically illustrated, it will be understood that system 1500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1500 includes interface 1514, which can be coupled to interface 1512. In one example, interface 1514 represents an interface circuit, which can include standalone components and integrated circuitry. In one example, multiple user interface components or peripheral components, or both, couple to interface 1514. Network interface 1550 provides system 1500 the ability to communicate with remote devices (e.g., servers or other computing devices) over one or more networks. Network interface 1550 can include an Ethernet adapter, wireless interconnection components, cellular network interconnection components, USB (universal serial bus), or other wired or wireless standards-based or proprietary interfaces. Network interface 1550 can transmit data to a device that is in the same data center or rack or a remote device, which can include sending data stored in memory.

Some examples of network interface 1550 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 1500 includes one or more input/output (I/O) interface(s) 1560. I/O interface 1560 can include one or more interface components through which a user interacts with system 1500 (e.g., audio, alphanumeric, tactile/touch, or other interfacing). Peripheral interface 1570 can include any hardware interface not specifically mentioned above. Peripherals refer generally to devices that connect dependently to system 1500. A dependent connection is one where system 1500 provides the software platform or hardware platform or both on which operation executes, and with which a user interacts.

In one example, system 1500 includes storage subsystem 1580 to store data in a nonvolatile manner. In one example, in certain system implementations, at least certain components of storage 1580 can overlap with components of memory subsystem 1520. Storage subsystem 1580 includes storage device(s) 1584, which can be or include any conventional medium for storing large amounts of data in a nonvolatile manner, such as one or more magnetic, solid state, or optical based disks, or a combination. Storage 1584 holds code or instructions and data 1586 in a persistent state (e.g., the value is retained despite interruption of power to system 1500). Storage 1584 can be generically considered to be a "memory," although memory 1530 is typically the executing or operating memory to provide instructions to processor 1510. Whereas storage 1584 is nonvolatile, memory 1530 can include volatile memory (e.g., the value or state of the data is indeterminate if power is interrupted to system 1500). In one example, storage subsystem 1580 includes controller 1582 to interface with storage 1584. In one example controller 1582 is a physical part of interface 1514 or processor 1510 or can include circuits or logic in both processor 1510 and interface 1514.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 1500. More specifically, power source typically interfaces to one or multiple power supplies in system 1500 to provide power to the components of system 1500. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1500 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes one or more examples, and includes an apparatus comprising: a network interface device comprising: circuitry to track one or more gaps in received packet sequence numbers using data and circuitry to indicate to a sender of packets non-delivered packets to identify a range of delivered packets.

Example 2 includes one or more examples, wherein the data identifies delivered packets and undelivered packets for one or more connections.

Example 3 includes one or more examples, wherein to indicate to a sender of packets non-delivered packets to identify a range of delivered packets, the circuitry is to: provide negative acknowledgement sequence range indicating a start and end of non-delivered packets.

Example 4 includes one or more examples, wherein the network interface device comprises circuitry to identify a range of delivered packets by providing a sequence range indicating a start and end of non-delivered packets.

Example 5 includes one or more examples, wherein the network interface device comprises circuitry to identify a range of delivered packets by providing a sequence range indicating an acknowledgement up to and including a sequence number.

Example 6 includes one or more examples, wherein delivered packets comprise packets provided for additional protocol processing.

Example 7 includes one or more examples, comprising at least one processor to perform additional protocol processing and wherein additional protocol processing comprises one or more of: definition of messages, and network operation semantics; reassembly of datagrams into messages; multi-path receive reassembly, congestion control; or quality of service management.

Example 8 includes one or more examples, wherein the network interface device comprises circuitry to manage gaps in received packet sequence numbers using the data and based on receipt of packets with sequential packet numbers, provide the received packets with sequential packet numbers for protocol processing.

Example 9 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

Example 10 includes one or more examples, and includes a method comprising: at a network interface device: transmitting one or more packets to a receiver and re-transmitting one or more packets based on receipt of an indication of a range with start and end of non-delivered packets or timeout.

Example 11 includes one or more examples, wherein the indication comprises: a negative acknowledgement sequence range indicating a start and end of non-delivered packets.

Example 12 includes one or more examples, wherein the indication comprises: a range of delivered packets comprising a sequence range indicating a start and end of non-delivered packets.

Example 13 includes one or more examples, wherein the indication comprises: a range of delivered packets comprising a sequence range indicating an acknowledgement up to and including a sequence number.

Example 14 includes one or more examples, comprising: setting a retry time-out to a shorter timeout based on a range in which a last packet was transmitted or setting a retry time-out to a longer timeout based on more than the range having been transmitted.

Example 15 includes one or more examples, and includes at least one non-transitory computer-readable medium comprising instructions stored thereon, that if executed by one or more processors, cause the one or more processors to: configure a network interface device to track one or more gaps in received packet sequence numbers using data and indicate to a sender of packets non-delivered packets to identify a range of delivered packets.

Example 16 includes one or more examples, wherein the data identifies delivered packets and undelivered packets.

Example 17 includes one or more examples, wherein to indicate to a sender of packets non-delivered packets to identify a range of delivered packets comprises provide negative acknowledgement sequence range indicating a start and end of non-delivered packets.

Example 18 includes one or more examples, comprising instructions stored thereon, that if executed by one or more processors, cause the one or more processors to: identify a range of delivered packets by providing a sequence range indicating a start and end of non-delivered packets.

Example 19 includes one or more examples, comprising instructions stored thereon, that if executed by one or more processors, cause the one or more processors to: identify a range of delivered packets by providing a sequence range indicating an acknowledgement up to and including a sequence number.

Example 20 includes one or more examples comprising instructions stored thereon, that if executed by one or more processors, cause the one or more processors to: perform higher layer protocol processing on delivered packets, wherein higher layer protocol processing comprises one or more of: definition of messages, and network operation semantics; fragmentation of messages into datagrams, and reassembly of datagrams into messages; multi-pathing and load-balancing of datagrams across paths; congestion control; or quality of service management.

Example 21 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

What is claimed is:

1. An apparatus comprising:
   a network interface device comprising:
   a network interface;
   a direct memory access (DMA) circuitry;
   a host interface;
   circuitry to track one or more gaps in packet sequence numbers associated with received packets by storage of received packet sequence numbers in a data and
   circuitry to transmit an indication in at least one packet, to a sender of the packets with the packet sequence numbers, wherein
      the indication is to indicate a range of one or more non-delivered packets and a range of one or more delivered packets,
      the indication comprises a negative acknowledgement sequence number range that is to indicate a range that includes a start sequence number and end sequence number of non-delivered packets,
      the indication includes an opcode,
      the opcode is to indicate a format of the indication, and
      the format of the indication is selected from among: positive acknowledgment of packet receipt, negative acknowledgement of packet receipt, invalid state, and receiver not ready to process a particular packet.

2. The apparatus of claim 1, wherein the network interface device comprises circuitry to identify a range of delivered packets by providing a sequence range indicating start and end sequence numbers of non-delivered packets.

3. The apparatus of claim 1, wherein the network interface device comprises circuitry to identify a range of delivered packets by providing a sequence range indicating an acknowledgement up to and including a sequence number.

4. The apparatus of claim 1, comprising at least one processor to perform additional protocol processing on received packets and wherein additional protocol processing comprises one or more of: definition of messages, and network operation semantics; reassembly of datagrams into messages; multi-path receive reassembly; congestion control; or quality of service management.

5. The apparatus of claim 1, wherein the network interface device comprises circuitry to manage gaps in received packet sequence numbers using the data and based on receipt of packets with sequential packet numbers, provide received packets with sequential packet numbers for protocol processing.

6. The apparatus of claim 1, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

7. A method comprising:
   a network interface device:
      transmitting a first group of packets using a reliable transport protocol and transmitting a second group of packets using an unreliable transport protocol, wherein:
      for the first group of packets transmitted using the reliable transport protocol:
         transmitting one or more packets to a receiver and
         re-transmitting one or more packets based on receipt of an indication of a range with start and end of non-delivered packets and
      for the second group of packets transmitted using the unreliable transport protocol: transmitting the second group of packets to the receiver.

8. The method of claim 7, wherein the indication comprises:
   a range of delivered packets comprising a sequence range indicating a start and end of non-delivered packets.

9. The method of claim 7, wherein the indication comprises:
   a range of delivered packets comprising a sequence range indicating an acknowledgement up to and including a sequence number.

10. The method of claim 7, comprising:
    reducing a duration of a retry time-out based on a range, wherein packet re-send is based on the retry time-out and the range is based on a difference between a number of packets sent and packets having receipt acknowledged and also based on a number of consecutive lost packets.

11. The method of claim 7, comprising:
    the network interface device:
       re-transmitting packets by performing go-back-N (GBN) retry and changing to selective retry, wherein for GBN retry, the network interface device re-transmitting the packets starting at sequence number N.

12. The method of claim 7, comprising:
    the network interface device:
       re-transmitting packets by selective retry and changing to performing go-back-N (GBN) retry, wherein for GBN retry, the network interface device re-transmitting the packets starting at sequence number N.

13. At least one non-transitory computer-readable medium comprising instructions stored thereon, that if executed by one or more processors, cause the one or more processors to:

configure a network interface device to
  track, in a data, one or more gaps in packet sequence numbers based on received packets and
  transmit an indication to a sender of the packets with the packet sequence numbers, wherein:
    the indication is to indicate a range of one or more non-delivered packets and a range of one or more delivered packets,
    the indication comprises a negative acknowledgement sequence number range that is to indicate a range that includes a start sequence number and end sequence number of non-delivered packets,
    the indication includes an opcode,
    the opcode is to indicate a format of the indication, and
    the format of the indication is selected from among: positive acknowledgment of packet receipt, negative acknowledgement of packet receipt, invalid state, and receiver not ready to process a particular packet.

14. The computer-readable medium of claim 13, wherein the data identifies delivered packets and undelivered packets.

15. The computer-readable medium of claim 13, comprising instructions stored thereon, that if executed by one or more processors, cause the one or more processors to:
  identify a range of delivered packets by providing a sequence range indicating start and end sequence numbers of non-delivered packets.

16. The computer-readable medium of claim 13, comprising instructions stored thereon, that if executed by one or more processors, cause the one or more processors to:
  identify a range of delivered packets by providing a sequence range indicating an acknowledgement up to and including a sequence number.

17. The computer-readable medium of claim 13, comprising instructions stored thereon, that if executed by one or more processors, cause the one or more processors to:
  perform higher layer protocol processing on delivered packets, wherein higher layer protocol processing comprises one or more of: definition of messages, and network operation semantics; fragmentation of messages into datagrams, and reassembly of datagrams into messages; multi-pathing and load-balancing of datagrams across paths; congestion control; or quality of service management.

18. The computer-readable medium of claim 13, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

* * * * *